(12) United States Patent
Oliveti et al.

(10) Patent No.: US 6,885,802 B2
(45) Date of Patent: Apr. 26, 2005

(54) NETWORK FOR DISTRIBUTING SIGNALS TO A PLURALITY OF USER EQUIPMENT

(75) Inventors: Guidö Oliveti, Turin (IT); Francesco Ivan Pomarico, Trezzano sul Naviglio (IT); Giacomo Roba, Monza (IT); Davide Sarchi, Milan (IT); Francesco Sartori, Agnadello (IT)

(73) Assignee: Pirelli S.p.A., Milan (IT)

( * ) Notice: Subject to any disclaimer, the term of this patent is extended or adjusted under 35 U.S.C. 154(b) by 0 days.

(21) Appl. No.: 10/362,841

(22) PCT Filed: Sep. 7, 2001

(86) PCT No.: PCT/IT01/00466

§ 371 (c)(1),
(2), (4) Date: Aug. 25, 2003

(87) PCT Pub. No.: WO02/21731

PCT Pub. Date: Mar. 14, 2002

(65) Prior Publication Data

US 2004/0033039 A1 Feb. 19, 2004

Related U.S. Application Data

(60) Provisional application No. 60/242,715, filed on Oct. 25, 2000.

(30) Foreign Application Priority Data

Sep. 11, 2000 (IT) .................................... MI2000A1983

(51) Int. Cl.⁷ ................................................. G02B 6/02
(52) U.S. Cl. ....................... 385/123; 385/124; 385/127; 385/132; 385/24; 385/28
(58) Field of Search ................................. 385/123–132, 385/24, 27, 28

(56) References Cited

U.S. PATENT DOCUMENTS

| 4,025,156 A | 5/1977 | Gloge et al. |
| 4,204,745 A | 5/1980 | Sakai et al. |
| 4,478,622 A | 10/1984 | Olshansky |
| 5,175,785 A | 12/1992 | Dabby |
| 5,278,931 A | 1/1994 | Antos et al. |
| 5,329,607 A | 7/1994 | Kamikawa et al. |
| 5,940,567 A | 8/1999 | Garito |
| 2003/0095263 A1 * | 5/2003 | Varshneya et al. .......... 356/477 |

FOREIGN PATENT DOCUMENTS

WO         WO 99/22471         5/1999

OTHER PUBLICATIONS

Ries, R., "Signal Transmission With Optical Carriers in Mulitmode Range of Single–Mode Fibres", Electronics Letters, vol. 23, No. 2, pp. 71–72. (1987).

(Continued)

*Primary Examiner*—Fayez G. Assaf
(74) *Attorney, Agent, or Firm*—Finnegan, Henderson, Farabow, Garrett & Dunner, L.L.P.

(57) ABSTRACT

A network for distributing signals to a plurality of user having a distribution unit and a plurality of optical cables adapted to make the distribution unit communicate with the plurality of user equipment. In turn, each optical cable has an optical fibre having a core, a cladding and a predetermined simple refractive index profile $\Delta n(r)$. Each optical fibre is adapted to guarantee a single-mode propagation at higher wavelengths than about 1260 nm and a few-mode propagation at about 850 nm, and each optical fibre has such refractive index profile $\Delta n(r)$ as to guarantee macro-bending losses at 1550 nm that are less than about 0.5 dB and an intermodal delay $\Delta\tau$ at 850 nm that is less than or equal to, about 1 ns/Km.

54 Claims, 11 Drawing Sheets

OTHER PUBLICATIONS

Gillham, F.J., et al., "Single Mode Fiber Optic Transceiver Using Short Wavelength Active Devices in Long Wavelength Fiber", SPIE vol. 1179 Fiber Networking and Telecommunications, pp. 26–33, (1989).

Ishigure, T. et al., "Formation of the Refractive Index Profile in the Graded Index Polymer Optical Fiber for Gigabit Data Transmission", Journal of Lightwave Technology, vol. 15, No. 11, pp. 2095–2100, Nov. 1997.

Sakai, J. et al., "Design Considerations of Broadband Dual–Mode Optical Fibers" IEEE Transactions on Microwave Theory and Techniques, vol. MTT–26, No. 9, pp. 658–665, Sep. 1978.

Suto, Ko–ichi et al., "0.78$\mu$m Digital Transmission Characteristics Using 1.3–$\mu$m Optimized Single–Mode Fiber for a Subsciber Loop", Electronics and Communications in Japan, Part 1, vol. 75, No. 2, pp. 38–47, (1992).

Romelser, M. et al., "Sources and Systems: 800 NM Transmissions on 1300 NM SM Fiber" FOC/LAN '87 & MFOC–WEST, Eleventh Annual Int'l. Fiber Optic Communication and Local Area Network Exposition, pp. 388–391, (Oct. 26–30, 1987).

Stern, M. et al., "Three–Channel, High–Speed Transmission Over 8 km installed, 1300 nm Optimised Single–Mode Fibre Using 800 nm CD Laser and 1300/1500 nm LED Transmitters", Electronic Letters, vol. 24, No. 3, pp. 176–177 (Feb. 4, 1998).

Stern, M. et al., "Short–wavelength transmission on 1300 nm Optimized Single–mode Fiber" Optical Engineering, vol. 27, No. 10, pp. 901–908, (Oct. 1998).

Jorring, H., "Design of Optical Fibre for Single–Mode transmission at 800 nm", E–FOC 91, EFOC/LAN 91, Ninth Annual European Fiber Optic Communications and Local Area Network Conference, pp. 105–108, (Jun. 19–21, 1991).

Van Leeuwen, K., et al., "Measurement of Higher–order Mode Attenuation in Single–Mode Fibers: Effective Cutoff Wavelength", Optics Letters, vol. 9, No. 6, pp. 252–254, (Jun. 1984).

Kitayama, K. et al., "Experimental Verification of Modal Dispersion Free Characteristics in a Two–Mode Optical Fiber", IEEE Journal of Quantum Electronics, vol. QE–15, No. 1, pp. 7–8,(Jan. 1979).

Sakai, J. et al., "Large–core, Broadband Optical Fiber", Optics Letters, vol. 1, No. 5, pp. 169–171, (Nov. 1977).

Grasso, G. et al., "Micobending Losses of Cabled Single Mode Fibres", ECOC '88, pp. 526–532, (1988).

Grasso, G. et al., "Microbending Effects in Single Mode Optical Cables", International Wire & Cable Symposium Proceedings, pp. 722–731 (1988).

* cited by examiner

NETWORK FOR DISTRIBUTING SIGNALS TO A PLURALITY OF USER EQUIPMENT

CROSS REFERENCE TO RELATED APPLICATIONS

This application is a national phase application based on PCT/IT01/00466, filed Sep. 7, 2001, the content of which is incorporated herein by reference, and claims the priority of Italian Patent Application No. MI2000A001983, filed Sep. 11, 2000, the content of which is incorporated herein by reference, and claims the benefit of U.S. Provisional Application No. 60/242,715, filed Oct. 25, 2000, the content of which is incorporated herein by reference.

BACKGROUND OF THE INVENTION

1. Field of the Invention

The present invention relates to a signal distribution network from a common branch point to a plurality of user equipment, comprising a distribution unit and a plurality of optical-fibre cables.

The present invention also relates to an optical-fibre cable and to an optical fibre adapted to be used in a signal distribution network.

2. Description of the Related Art

Currently, in the telecommunication field optical technology is mainly used for long-distance transmission of optical signals using the known properties of wide band provided by optical fibres. On the contrary, the most used technology for distributing signals to a plurality of users (such as for example, television and/or analogue and/or digital telephone signals) and for transmitting digital data between electronic equipment (such as for example, the Personal Computers of a LAN network) makes use of electric cables such as, for example, coaxial cables or those consisting of copper pairs.

Nevertheless, electric cables have a relatively narrow band, and they are becoming a bottleneck with respect to the band of signals to be transmitted. Moreover, they exhibit problems of electromagnetic interferences, of impedance matching, and they are difficult to be introduced into the special raceways of a building since they are stiff. In addition, being bulky, they significantly reduce the number of cables that can be inserted into a raceway.

Moreover, due to electrical safety requirements, they require the arrangement of separate raceways from those used for distributing electric energy.

Thus, the research is turning towards the possibility of using optics not just in the long-distance transmission of signals, but also in the signal distribution networks from a common branch point to a plurality of users. In fact, optical-fibre cables are suitable for being inserted into the special raceways of a building since they are not too bulky, they are flexible, light, and free from electromagnetic interferences. Moreover, they are suitable to be inserted into the same raceways used for distributing electric energy. Furthermore, optical fibres potentially have a very wide band, low attenuation values, and they are transparent to the bit rate, to the format and to the transmission code.

Moreover, among the various types of optical fibres, conventional single-mode optical fibres are more preferable than those multi-mode since they are in se less expensive, with lower absorption losses; they are adapted to be used for a wavelength division multiplexing (WDM) transmission and they have a wider band.

Typically, according to the ITU-T G652 standard, conventional single-mode optical fibres have a cutoff wavelength comprised between 1100 and 1280 nm, and they are used with laser sources and detectors operating at about 1300 and/or 1550 nm for the purpose of allowing a transmission in the second or third optical fibre transmission window and a single-mode propagation (at a greater signal wavelength than the cutoff wavelength).

Nevertheless, due to the relatively high cost of optoelecronic and optical components (such as for example, optical sources and detectors) operating at about 1300 and/or 1550 nm, distribution networks comprising conventional single-mode optical fibres operating in single-mode propagation condition are not very competitive with respect to conventional networks using electrical cables.

Thus, although conventional single-mode optical fibres exhibit several advantages, their use in signal distribution networks to a plurality of users has been strongly limited so far.

For the purpose of overcoming said disadvantages, it has been proposed to implement signal transmission lines with conventional single-mode optical fibres at 1300 and laser sources and detectors operating at about 800 nm, that is, with optical fibres operating in multi-mode propagation condition [G. A. Bogert ("*Signal transmission with optical carriers in multimode range of single-mode fibres*", Electronics Letters, January 1987, Vol. 23, No. 2, pages 71–73); F. J. Gillham et al. ("*Single mode fiber optic transceiver using short wavelength active devices in long wavelength fiber*" SPIE Fiber Networking and telecommunications, 1989, Vol. 1179, pages 26–33); V. C. Y. So et al. ("*Multiple wavelength bidirectional transmission for subscriber loop applications*", Electronics Letters, January 1989, Vol. 25, No. 1, pages 16–19) and Ko-ichi Suto et al. ("*0.78-μm digital transmission characteristics using 1.3-μm optimized single-mode fiber for subscriber loop*" Electronics and Communications in Japan, Part 1, 1992, Vol. 75, No. 2, pages 38–47)].

In fact, said lines allow exploiting the above advantages of single-mode optical fibres and at the same time, reducing the costs as laser sources and detectors operating at about 800 nm are much less expensive than those operating at about 1300 or 1550 nm.

Nevertheless, when used in multi-mode propagation condition, optical fibres exhibit the known phenomenon of intermodal dispersion according to which two different propagation modes (for example, the fundamental mode $LP_{01}$ and the first higher-order mode $LP_{11}$) travel at different group velocities, thus causing a temporal broadening of an optical pulse that propagates in fibre.

In an optical-fibre transmission line operating in multi-mode propagation conditions, thus, the intermodal dispersion limits the maximum data transmission speed (that is, the bit rate) or the maximum length of the line.

Some methods have been proposed for the purpose of reducing the intermodal dispersion phenomenon.

M. Romeiser et al. ("*Sources and systems: 800 nm transmission on 1300 nm SM fiber*", FOC/LAN '87 & MFOC-WEST, pagg. 388–3891); M. Stern et al. ("*Three-channel, high-speed transmission over 8 Km installed, 1300 nm optimised single-mode fibre using 800 nm CD laser and 1300/1500 nm LED transmitters*", Electronics Letters, February 1988, Vol. 24, No. 3, pages 176–177); J. L. McNaughton et al. ("*A compact-disc laser system for video single-mode fiber distribution in the subscriber loop*", FOC/LAN '88, pages 231–233); M. Stern et al. ("*Short-wavelength transmission on 1300 nm optimized single-mode fiber*", Optical Engineering, October 1988, Vol. 27, No. 10, pages 901–908) and H. Jorring ("*Design of optical fibre for single-mode transmission at 800 nm*", E-FOC/LAN '91, pages 105–108) disclose a local transmission system comprising a conventional optical fibre single-mode at 1300 nm, a laser source (for example, a laser for compact disc or CD) with emission at 800/850 nm and a modal filter for eliminating higher-order modes.

K. A. H. van Leeuwen et al. ("*Measurement of higher-order mode attenuation in single-mode fibers: effective cutoff wavelength*", Optics Letters, June 1984, Vol. 9, No.6, pages 252–254) say that a single-mode optical fibre communication system can operate below the theoretical cutoff wavelength of the $LP_{11}$ mode if the attenuation of the light transmitted in the $LP_{11}$ mode is sufficiently high to reduce the effects of modal noise and of intermodal dispersion. For this purpose, the Authors introduce a method for determining an attenuation coefficient depending on the wavelength of $LP_{11}$ mode in a single-mode optical fibre.

K. Kitayama et al. ("*Exerimental verification of modal dispersion free characteristics in a two-mode optical fiber*", IEEE Journal of Quantum Electronics, January 1979, Vol. QE-15, No. 1, pages 6–8) disclose the results of theoretical calculations and experimental measures adapted to determine the group delay of $LP_{01}$ and $LP_{11}$ modes in a step-index optical fibre along a wavelength region wherein the optical fibre only guides two modes. The results obtained show that there is a wavelength at which the group delays of the two modes coincide.

U.S. Pat. No. 4,955,014 proposes an optical waveguide communication system in the subscriber area wherein the conventional single-mode optical waveguide, optimised for propagation in the range from 1300 to 1600 nm, is used with optical transmitters and receivers whose operating wavelengths are below the waveguide cutoff wavelength. The waveguide is coupled to the laser in such way as to excite a single propagation mode thus allowing a high bit rate digital signal transmission.

U.S. Pat. No. 4,204,745 discloses a graded-index optical fibre having a distribution of the refractive index n as a function of the radial distance r from the core axis, given by $$n = n_o [1 - \Delta (r/a)^\alpha]^{1/2} \quad 0 \leq r \leq a$$

$$n = n_o [1 - \Delta] = n_e \quad r \geq a$$

where $n_o$ is the refractive index at the core axis, a is the core radius, $\alpha$ is a power exponent, $\Delta = (n_o - n_e)/n_e$ and $n_e$ is the cladding refractive index. In said fibre the power exponent $\alpha$ and the normalised frequency $v$ [$v = (2\pi a n_o/\lambda) * (2\Delta)^{1/2}$] are selected so that the group delay of the fundamental mode is equal to that of the first higher-order mode.

The Applicant notes that said patent relates to the radiation transmission in multi-mode, and preferably two-mode, propagation condition, in particular at the wavelength of 1.25 $\mu$m, and it does not disclose nor it suggests the use of the fibre in single-mode propagation condition.

U.S. Pat. No. 4,877,304 discloses an optical fibre wherein the refractive index $n_o$ at the core axis, the refractive index of the cladding $n_1$ the core radius a and the core refractive index profile are selected so that: (a) the difference between the normalised delay time of the j-th mode (with j=1 or 2) and the normalised delay time of the fundamental mode is less than about $5*10^{-2}$ over a wide range of values of the normalised frequency V [$V = (n_1^2 - n_0^2)^{1/2} * (2\pi a)/\lambda)$] and (b) the normalised waveguide dispersion is less than or equal to, 0.2 at V values near the normalised cutoff frequency of the first higher-order mode. In the patent description it is said that, due to the limited number of variables in the design of a step-index refractive profile, or of the $\alpha$ type, fibres having said refractive index profile are not expected to meet both conditions (a) and (b). Examples of fibres capable of meeting said conditions are, for example, those having a segmented core index profile and of the W type. An optical fibre with the above features (a) and (b) can propagate a signal having two or three modes over the wavelength range between 800 and 900 nm with bandwidths comprised between 2 and 4 GHz*Km, and a low dispersion single-mode signal (total dispersion less than 5 ps/Km*nm) at wavelengths greater than 1250 nm.

In the above patent, it is said that said fibre can be used in a certain number of system applications. For example, at first, when the bandwidth requirements are comprised between 2 and 4 GHz*Km, a system using said optical fibre can be operated at wavelengths comprised between 800 and 900 nm wherein the optical fibre guides few modes, so as to exploit the advantage of using low-priced sources and connectors. On the other hand, when at a later time the bandwidth requirements increase, the system can be-upgraded by using terminal equipment operating at higher bit rates, and sources and detectors operating in the low dispersion single-mode region of the optical fibre.

Nevertheless, the Applicant notes that in the practice, the optical fibre disclosed by U.S. Pat. No. 4,877,304 is very difficult and expensive to make. Thus, it is not adapted to be used in an optical fibre distribution network wherein the cost factor is very important.

Jun-ichi Sakai et al. ("*Large-core, broadband optical fiber*", OPTICS LETTERS, Vol. 1, No. 5, 1977, pages 169–171) disclose a bimodal broadband optical fibre with larger core diameter than that of a conventional single-mode optical fiber. They state that, by choosing normalized frequency equal to 4.6 and refractive index profile parameter a equal to 4.5, a core diameter as large as 16.3 $\mu$m with relative index difference equal to 0.3% at the 1.25 $\mu$m wavelength is attainable.

SUMMARY OF THE INVENTION

The Applicant faced the technical problem of providing a signal distribution network in a simple and effective way, which in a first moment, when the band requirements are relatively limited, is suitable to be used at wide bandwidth at about 850 nm in a few-mode propagation condition in which it is competitive in terms of costs with respect to a conventional distribution network using electrical cable and which, at a later time, when the bandwidth requirements increase, is suitable to be upgraded to operate in a very wide-band single-mode propagation condition at about 1300 and 1550 nm.

Thus, in a first aspect thereof., the present invention relates to a network for distributing signals to a plurality of user equipment, comprising a distribution unit, and a plurality of optical cables adapted to make said distribution unit communicate with said plurality of user equipment, each optical cable comprising an optical fibre having a core, a cladding and a predetermined simple refractive index profile $\Delta n(r)$, where $\Delta n(r)$ is the refractive index difference between the core and the cladding as a function of the radial distance r, each optical fibre being adapted to guarantee a single-mode propagation at wavelengths that are higher than about 1260 nm and a propagation of few modes at about 850 nm, characterised in that each optical fibre has such refractive index profile $\Delta n(r)$ as to guarantee macro-bending losses at 1550 nm that are less than about 0.5 dB after 100 turns on a mandrel having a 60-mm diameter; and an intermodal delay $\Delta\tau$ at 850 nm that is less than or equal to, about 1 ns/Km.

In this description and following claims, the expression few-mode propagation" is used to indicate an optical fibre propagation of the fundamental mode $LP_{01}$ and of the first higher-order mode $LP_{11}$ and, optionally, of the second higher-order mode $LP_{02}$. Nevertheless the latter, when present, is strongly disadvantaged by the high attenuation to which it is subject in the typical conditions of use. Preferably, the expression "few-mode propagation" is used to indicate a two-mode optical fibre propagation (of the fundamental mode $LP_{01}$ and of the first higher-order mode $LP_{11}$) for preventing power losses caused by the attenuation of the second mode $LP_{02}$;

"simple refractive index profile" is used to indicate a refractive index profile defined by a single radial segment of the fibre apart from possible fluctuations due to the production process, small dips or diffusion tails.

According to the Applicant's perception, by optimising both the transmission capacity at 850 nm, in few-mode propagation condition, and at 1550 nm, in single-mode propagation condition, it is possible to obtain an upgradeable multi-wavelength optical distribution network with very wide bandwidth.

The optical fibres of the distribution network of the invention are adapted to operate in a few-mode propagation condition at 850 nm with an intermodal delay $\Delta\tau$ that is less than about 1 ns/Km, thus allowing the use, in an effective way, of low-priced optical and/or opto-electronic components operating at 850 nm with a high bandwidth.

Moreover, the optical fibres of the distribution network of the invention advantageously have macro-bending losses at 1550 nm, for the fundamental propagation mode $LP_{01}$, which are less than 0.5 dB after 100 turns of fibre wound around a 60-mm diameter mandrel (corresponding to about 26 dB/Km).

Moreover, since it has been proved that macro-bending losses relating to a propagation mode increase as the wavelength increases, the optical fibres of the network of the invention have macro-bending losses, for the fundamental propagation mode, which are less than 0.5 dB also at 1300 nm and at 850 nm.

The Applicant has found that the optical fibres of the invention with bending losses that are less than 0.5 dB at 1550 nm allow a significant reduction of the undesired effects of the hard conditions at which the fibres in a distribution network are subject both in a few-mode propagation condition and in a single-mode propagation condition. In fact, in a distribution network installed in a building, due to the winding path of the raceways in which optical fibres are inserted, to the presence of other electrical or optical cables into the raceways, and to the pressures exerted by the raceway internal walls, optical fibres are subject to strong stresses, bending, twisting, side pressures on rough surfaces, which are cause of strong attenuations on a signal propagating into the fibre.

In particular, the Applicant has found that the fibre with the above features provides low bending losses in heavy use conditions, such as those typical of the installation into buildings, at least up to a 1625-nm wavelength, so as to allow the transmission up to the upper limit of the transmission band at 1550 nm.

Thus, the distribution network of the invention is advantageously adapted to operate at low cost (at about 850 nm) and in an effective way ($\Delta\tau$ less than 1 ns/Km and bending losses lower than 0.5 dB at 850 nm) in a few-mode propagation condition, and it is upgradeable to efficaciously operate in a single-mode propagation condition (bending losses at 1300 and 1550 nm lower than 0.5 dB).

At first, when the bandwidth requirements are relatively limited, the distribution network of the invention is thus adapted to be used at a low cost in a wide bandwidth few-mode propagation condition, and it is competitive in terms of costs with respect to a conventional distribution network using electrical cables. Moreover, at a later time, when the band requirements increase, it is adapted to be upgraded to operate in a very wide bandwidth single-mode propagation condition.

In particular, the distribution network of the invention allows the optical transmission of signals, transmitted by one or more providers, at any wavelength in one or more of the three bands at 850 nm, 1300 nm, 1550 nm, directly to final users.

Moreover, since the optical fibres of the invention have a simple refractive index profile, they are highly compatible with single-mode optical fibres according to the ITU-T G 652 standard, also having a simple refractive index profile.

Moreover, the optical fibres of the invention with simple refractive index profile are easy to manufacture, and they guarantee low production costs and few rejects.

Preferably, the intermodal delay $\Delta\tau$ at 850 nm is less than about 0.5 ns/Km. More preferably, the intermodal delay $\Delta\tau$ at 850 nm is less than about 0.05 ns/Km.

Preferably, macro-bending losses at 1550 nm after 100 turns on a mandrel having a 60-mm diameter are less than about 0.2 dB.

Preferably, the optical fibres of the distribution network of the invention are such as to have micro-bending losses at 1550 nm that are less than about 15 $[(dB/Km)/(g/mm)]$. More preferably, less than about circa 10$[(dB/Km)/(g/mm)]$.

Micro-bending losses can be measured with the method of expansible coil, disclosed for example by G. Grasso and F. Meli in "Microbending losses of cabled single-mode fibers," ECOC '88, page 526-on, or by G. Grasso et al. in "Microbending effects in single-mode optical cables," International Wire and Cable Symposium, 1988, pages 722-on.

The cladding of each optical fibre has a lower refractive index with respect to that of the core, so as to confine the transmitted signal into the latter.

Typically, both the core and the cladding are of a silica-based glass material (n equal to about 1.46) and the refractive index difference between core and cladding is obtained by incorporating suitable additives (dopants) to the glass matrix of the core and/or of the cladding so as to obtain the predetermined refractive index profile $\Delta n(r)$.

Typical examples of said dopants are fluorine, phosphorus and germanium.

From the measure—performed according to known methods—of the refractive index profile of a real fibre, in particular of a fibre manufactured with the production methods of "outside vapour deposition" (OVD) or of "vapour axial deposition" (VAD), it is possible to determine normalised frequency values V and $\Delta n_0$ values (defined below) according to the method disclosed below in the present description.

Preferably, each optical fibre has a normalised frequency value V at 850 nm (defined below) comprised between about 3.0 and 3.6. More preferably, it is comprised between about 3.2 and 3.6.

Typically, each optical fibre has a value of $\Delta n_0$ comprised between $5*10^{-3}$ and $7*10^{-3}$.

Advantageously, the semi-area subtended by the refractive index profile (that is, the area determined by integrating the value of the difference of refractive index between core and cladding by r variable from zero to a radial value corresponding to a cladding portion) is more than about 0.017 $\mu$m. Preferably, it is more than about 0.018 $\mu$m.

Advantageously, the core radius, defined according to the ITU-T G650 standard, of each optical fibre is comprised between 3 $\mu$m and 6 $\mu$m. This makes the optical fibres of the invention advantageously highly compatible with the single-mode optical fibres according to the ITU-T G652 standard having a radius typically comprised between 4 $\mu$m and 6 $\mu$m, and with the equipment, measuring instruments and optical and opto-electronic components used in conventional optical-fibre telecommunication systems (such as, for example, laser sources with conventional optical-fibre pigtail and optical connectors optimised to connect conventional single-mode optical fibres).

Advantageously, each optical fibre, outside the cladding, is provided with an external protective coating made of a polymeric material, typically consisting of two layers.

Typically, the diameter of the external protective coating is of about 250 $\mu$m. Moreover, the outer diameter of the cladding typically is of about 125 $\mu$m.

Preferably, the material of said external coating or at least the portion of said external coating in contact with the cladding, has a higher refractive index than that of the cladding. This advantageously allows stripping cladding modes ("mode stripping") that are typically excited in an optical fibre in the presence, for example, of welding, connection or bending, and which degrade the system performances when they are left to propagate up to the receiver.

More preferably, the refractive index of the material of which said external coating consists is higher than that of the cladding as the temperature changes, typically, in a temperature range comprised between 10° C. and 60° C. This allows guaranteeing a suppression of cladding modes also in variable temperature conditions. This is advantageous since in a signal distribution network installed in a building, optical fibres are typically subject to temperature variations due, for example, to their arrangement close to electrical cables, thermal sources for home heating purposes, hot-water mains, or electrical equipment.

According to an alternative, the external protective coating consists of a material capable of strongly absorbing the electromagnetic radiation at the wavelengths concerned, thus suppressing possible cladding modes.

Advantageously, the optical fibres of the network of the invention allow transmitting, in the few-mode propagation condition, optical signals at bit rates of 2.5 Gbit/s or more on a link of about 300-m length.

Advantageously, each optical cable also comprises a second optical fibre.

As regards the structural and functional features of said second optical fibre, reference shall be made to what disclosed above with reference to the first optical fibre.

Typically, on the user's side, the network of the invention also comprises a plurality of opto-electronic conversion devices in communication with the plurality of optical cables.

Each opto-electronic conversion device is adapted to convert an optical signal coming from the optical cable associated to it into a corresponding electrical signal to be sent to the corresponding user equipment.

Typically, each opto-electronic conversion device comprises a photodetector.

In a bi-directional embodiment, each opto-electronic conversion device is also adapted to convert an electrical signal coming from the user equipment associated to it into a corresponding optical signal to be sent to the corresponding optical cable. In this case, each opto-electronic conversion device also comprises a light source.

Typically, for the purpose of operating in a few-mode propagation condition of the optical fibre, said light source is adapted to operate at a wavelength comprised between about 820 and 870 nm. Preferably, it is adapted to operate at a wavelength comprised between about 830 and 860 nm. More preferably, it is adapted to operate at a wavelength of about 850 nm.

According to a variant, for the purpose of operating in a single-mode propagation condition of the optical fibre, said light source is adapted to operate at a wavelength comprised between about 1300 nm and 1625 nm.

Typically, on the distribution unit side, the network of the invention also comprises a plurality of opto-electronic converters in-communication with the plurality of optical cables.

Each opto-electronic converter is adapted to convert an electrical signal coming from the distribution unit into a corresponding optical signal to be sent to the relevant user equipment through the corresponding optical cable.

Typically, each opto-electronic conversion device comprises a conventional light source.

Typically, for the purpose of operating in a few-mode propagation condition of the optical fibre, said light source is adapted to operate at a wavelength comprised between about 820 and 870 nm. Preferably, it is adapted to operate at a wavelength comprised between about 830 and about 860 nm. More preferably, it is adapted to operate at a wavelength of about 850 nm.

According to a variant, for the purpose of operating in a single-mode propagation condition of the optical fibre, said light source is adapted to operate at a wavelength comprised between about 1300 nm and 1625 nm.

In a bi-directional embodiment, each opto-electronic converter is also adapted to convert an optical signal, coming from a user electrical equipment through the relevant optical cable, into a corresponding electrical signal.

In this case, each opto-electronic conversion device typically comprises a photodetector.

Typical examples of conventional light sources are VCSEL laser sources (vertical cavity surface emitting laser) with emission at about 850 nm or about 1310 nm. Moreover, typical examples of conventional light sources with emission in the range of 1300–1350nm or 1480–1625 nm are the Fabry-Perot lasers and the DFB or DBR semi-conductor lasers.

Typical examples of conventional photodetectors are the photodiodes, in particular of the PIN type.

Typically, the signals to distribute are digital.

Typically, in view of the use provided for the distribution of signals to the final users starting from a common branch point, the optical cable length is less than 2 Km. Preferably, their length is less than 1 Km. More preferably, less than 300 m.

According to an embodiment, on the user side the distribution network of the invention comprises at least one domestic network connected to a corresponding optical cable. Typically, the domestic network is of the star type or of the bus type.

The domestic network is adapted to send the signals coming from the optical cable to which it is connected, to a plurality of user equipment. For example, to a plurality of user equipment located in a user's house.

In this case, the distribution unit of the network of the invention is advantageously adapted to multiplex a plurality of signals at different wavelengths in a single wavelength division multiplexed (or WDM) optical signal and send it along the optical cable.

Typically, the domestic network comprises a wavelength selective optical coupler (of the conventional type) adapted to wavelength demultiplex the incoming WDM optical signal at its input, into a plurality of signals at different wavelengths, and to route them to opto-electronic conversion devices associated to the different user equipment.

According to a variant, the domestic network comprises an optical coupler (of the conventional type) adapted to split the power of the incoming WDM optical signal at its input, and to send the obtained power fractions of the WDM optical signal to opto-electronic conversion devices associated to the different user equipment. In this case, the opto-electronic conversion devices advantageously comprise also a filter for extracting from the WDM optical signal the wavelength carrying the information intended for the user equipment associated to it.

In a second aspect thereof, the present invention also relates to an optical cable adapted to be used in a signal distribution network, comprising at least one optical fibre having a core, a cladding and a predetermined simple refractive index profile $\Delta n(r)$, where $\Delta n(r)$ is to the refractive index difference between the core and the cladding as a function of the radial distance r, said at least one optical fibre being adapted to guarantee a single-mode propagation at higher wavelengths than about 1260 nm and a few-mode propagation at about 850 nm,
characterised in that said at least one optical fibre has such refractive index profile $\Delta n(r)$ as to guarantee macro-bending losses at 1550 nm that are less than about 0.5 dB after 100 turns on a mandrel having a 60-mm diameter; and an intermodal delay $\Delta\tau$ at 850 nm that is less than or equal to, about 1 ns/Km.

Preferably, said cable also comprises a second optical fibre.

As regards the structural and functional features of the optical fibres and of the optical cable, reference shall be made to what disclosed above with reference to the distribution network of the invention.

In a third aspect thereof, the present invention also relates to an optical fibre having a core, a cladding and a predetermined simple refractive index profile $\Delta n(r)$, where $\Delta n(r)$ refers to the refractive index difference between the core and the cladding as a function of the radial distance r, the optical fibre being adapted to guarantee a single-mode propagation at higher wavelengths than about 1260 nm and a few-mode propagation at about 850 nm,
characterised in that the optical fibre has such refractive index profile $\Delta n(r)$ as to guarantee macro-bending losses at 1550 nm that are less than about 0.5 dB after 100 turns on a mandrel having a 60-mm diameter; and an intermodal delay $\Delta\tau$ at 850 nm that is less than or equal to, about 1 ns/Km.

As regards the structural and functional features of the optical fibre, reference shall be made to what disclosed above with reference to the distribution network of the invention.

BRIEF DESCRIPTION OF THE DRAWINGS

Further features and advantages of the present invention will appear more clearly from the following detailed description of a preferred embodiment, made with reference to the attached drawings. In such drawings.

FIGS. 17(a)–(c) show two more examples of refractive index profiles $\Delta n(r)$ of the beta type.

DETAILED DESCRIPTION OF THE INVENTION

Figure 9:
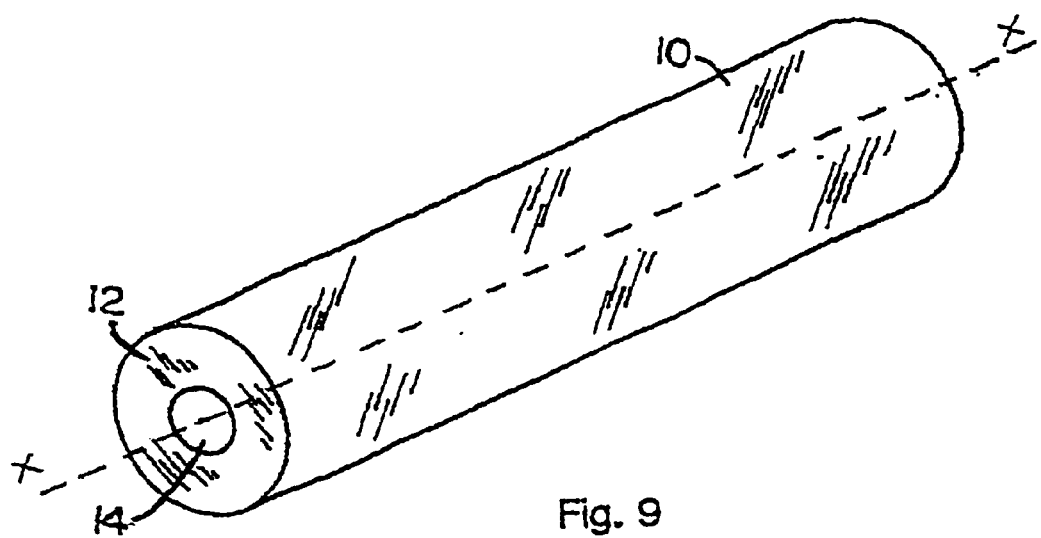
FIG. 9 shows an embodiment of an optical fibre according to the invention.

FIG. 9 shows an embodiment of an optical fibre 10 according to the invention, comprising an internal region 14, called core, into which an optical signal is transmitted, and an external annular region 12, called cladding. Cladding 12 has a lower refractive index with respect to that of core 14 so as to confine the transmitted signal into the latter.

Typically, both core 14 and cladding 12 are made of a silica-based glass material, and the refractive index difference between core 14 and cladding 12 is obtained by incorporating suitable additives (dopants) into the glass matrix of core 14 and/or of cladding 12.

Based on the radial distribution of the dopants into core 14 and cladding 12 of the optical fibre 10, a certain refractive index profile $\Delta n(r)$, is obtained, where $\Delta n(r)$ refers to the refractive index difference between core 14 and cladding 12 as a function of the radial distance r from the longitudinal axis xx of the optical fibre 10.

Typically, as shown in the examples disclosed below, cladding 12 is substantially made of pure silica, and it has a refractive index no which is substantially constant as the radial distance from axis xx changes.

The optical fibre 10 according to the invention has cutoff wavelengths for the first higher-order mode $LP_{11}$ and for the second higher-order mode $LP_{02}$ and simple refractive index profile $\Delta n(r)$ selected in such way as to provide

- a single-mode propagation at higher wavelengths than about 1260 nm—that is, a 2-m fibre cutoff wavelength (ITU-T G652) of the first higher-order mode $LP_{11}$ that is less than about 1260 nm;
- a few-mode propagation at about 850 nm—that is, a 2-m fibre cutoff wavelength (ITU-T G652) of the first higher-order mode $LP_{11}$ that is more than about 850 nm;
- macro-bending losses at 1550 nm that are less than about 0.5 dB after 100 turns of fibre around a mandrel having a 60-mm diameter (corresponding to 26 dB/Km); and
- an intermodal delay $\Delta\tau$ between the fundamental propagation mode $LP_{01}$ and the first higher-order mode $LP_{11}$ at 850 nm that is less than or equal to, about 1 ns/Km.

Moreover, the 2-m fibre cutoff wavelength (ITU-T G652) of the second higher-order mode $LP_{02}$ is preferably less than about 800 nm.

For example, a typical theoretical simple refractive index profile, hereinafter called "beta profile"—which is similar to the actual refractive index profile obtained with the conventional methods for producing optical fibres, known as "outside vapour deposition" (or OVD) and as "vapour axial deposition" (or VAD)—comprises a small dip at the centre of core 14 (typical of the OVD production process) with an initial parabolic pattern which afterwards becomes rectilinear; a central portion with a super-Gaussian pattern and an external tail with Laurentzian pattern, where the super-Gaussian pattern is given by the curve defined by the following relation $$\Delta n(r) = \Delta n_0 * e^{-\frac{1}{2}(\frac{r}{a})^g} \quad (A)$$

where r is the radial distance from the longitudinal axis xx of the optical fibre 10, a and g are two parameters of the radial dimension and form of the pattern, and the Laurentzian pattern is given by the curve defined by the following relation $$\Delta n(r) = Aw/[4(r-x_c)^2 + w^2] \quad (B)$$

where r is the radial distance from the longitudinal axis xx of the optical fibre 10 and parameters A, w, $x_c$ are form parameters selected so that the Laurentzian tail intersects the central super-Gaussian portion in the inflection point of the latter.

The Applicant has noted that the intermodal delay $\Delta\tau$ at 850 nm between the fundamental propagation mode $LP_{01}$ and the first higher-order mode $LP_{11}$ depends on the normalised frequency V, on the form parameter g of the central super-Gaussian portion of the beta profile, and in general, on the parameters defining the small dip, the super-Gaussian portion and the Laurentzian tail of the beta profile. The normalised frequency V is defined as $$V = \frac{2\pi a}{\lambda}\sqrt{2*n*\Delta n_0}$$

where $\Delta n_0$ is the maximum refractive index difference between core 14 and cladding 12, and n is the refractive index of silica (about 1.46) and a is the core radius.

For the beta profile, $\Delta n_0$ corresponds to the value taken by the interpolating super-Gaussian curve (relation A) for a value of r that is equal to zero, and a is the radial dimension parameter of the super-Gaussian curve.

Moreover, the Applicant has noted that macro-bending losses depend on the semi-area subtended by the simple refractive index profile and on the parameters defining the small dip, the super-Gaussian portion, and the Laurentzian tail of the beta profile.

Thus, computer simulations have been carried out to determine the values of the form parameter g of the central portion with super-Gaussian pattern of the beta profile, which allow obtaining an intermodal delay $\Delta\tau$ that is less than or equal to 1 ns/Km at 850 nm, as the normalised frequency V at 850 nm changes for different values of the beta profile parameters.

Moreover, computer simulations have been carried out to determine macro-bending losses at 1550 nm obtained on 100 turns of fibre wound around a mandrel having a 60-mm diameter for a fibre having the beta refractive index profile as the semi-area subtended by said profile changes for different values of the beta profile parameters.

Figure 13:
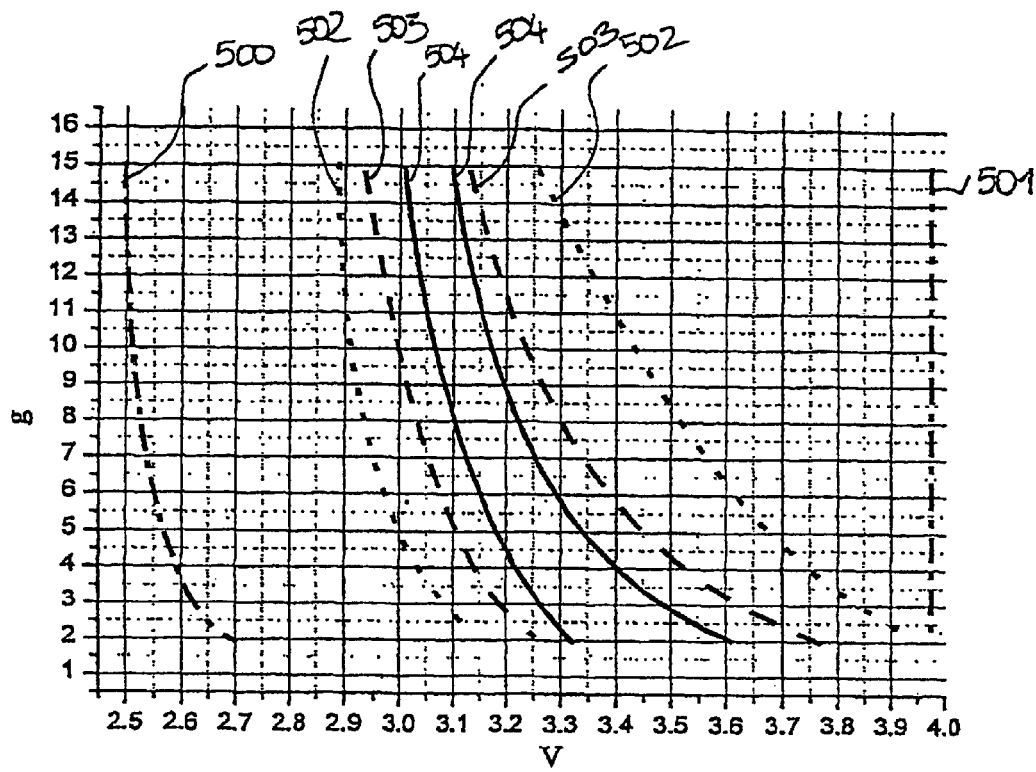
FIG. 13 shows the pattern of the form factor g as the normalised frequency changes, obtained with a refractive index profile of the beta type and for intermodal delay values that are less than or equal to, 1 ns/Km.

FIG. 13 shows the value of the form parameter g as the normalised frequency varies, obtained with the simulations.

In said figure, line 500 represents the normalised cutoff frequency of the first higher-order mode $LP_{11}$ whereas line 501 represents the normalised cutoff frequency of the second higher-order mode $LP_{02}$, that is, the two lines 500, 501 define within them a two-mode propagation region (of the fundamental mode $LP_{01}$ and of the first higher-order mode $LP_{11}$). Moreover, lines 502 delimit a region wherein there are concentrated the points (V,g) corresponding to the beta profiles having an intermodal delay that is less than or equal to, 1 ns/Km; lines 503 delimit a region wherein there are concentrated the points (V,g) corresponding to the beta profiles having an intermodal delay that is less than or equal to, 0.5 ns/Km and lines 504 delimit a region wherein there are concentrated the points (V,g) corresponding to the beta profiles having an intermodal delay that is less than or equal to, about 0.05 ns/Km.

As it can be noted, for an optical fibre having a refractive index profile of the beta type to have an intermodal delay $\Delta\tau$ less than 1 ns/Km, the normalised frequency V at 850 nm must be comprised between about 2.85 and about 3.95. Preferably, the normalised frequency V is comprised between about 3.0 and 3.6. More preferably, it is comprised between about 3.2 and 3.6. In this last case, the value of the form parameter g is preferably less than or equal to, 9.

Figure 14:
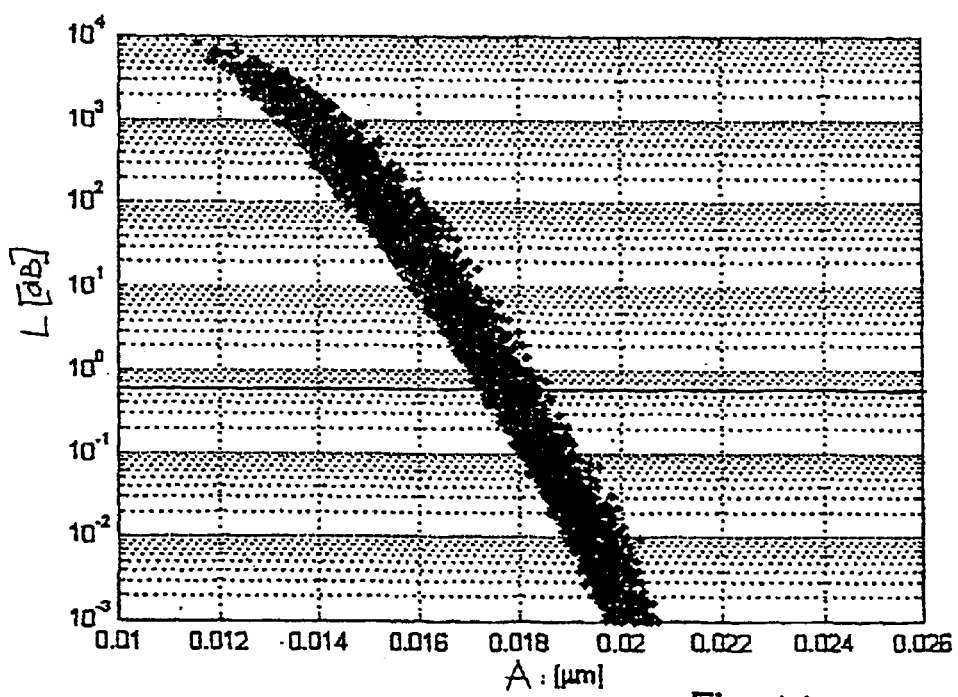
FIG. 14 shows the pattern of bending losses as the semi-area subtended by the refractive index profile changes, obtained with a beta type profile.
Figure 15A:
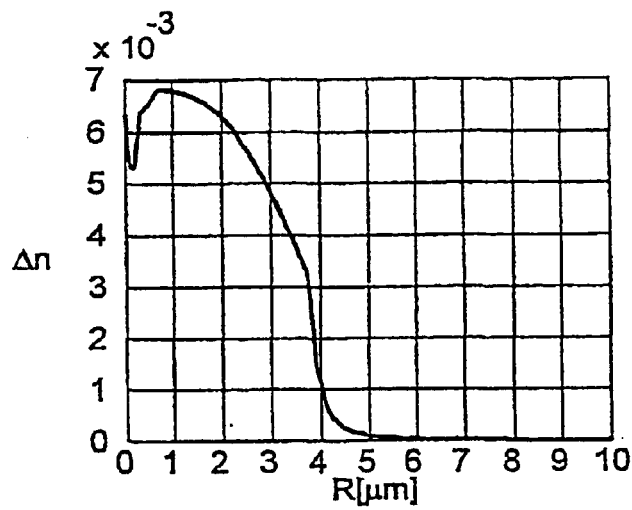
FIGS. 15(a)–(c) show three more examples of refractive index profiles $\Delta n(r)$ of the beta type.
Figure 15B:
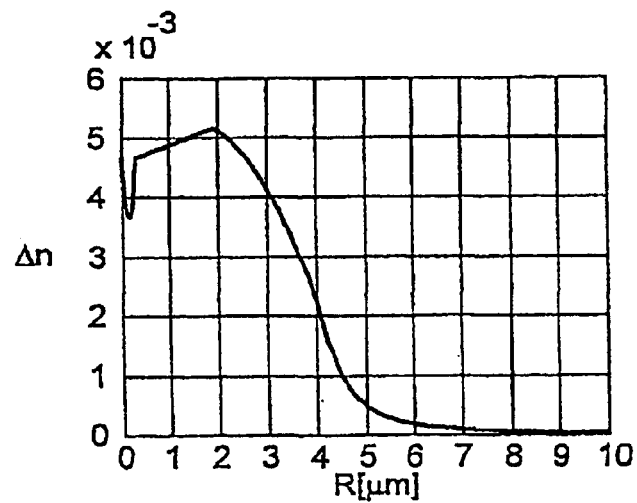
Figure 15C:
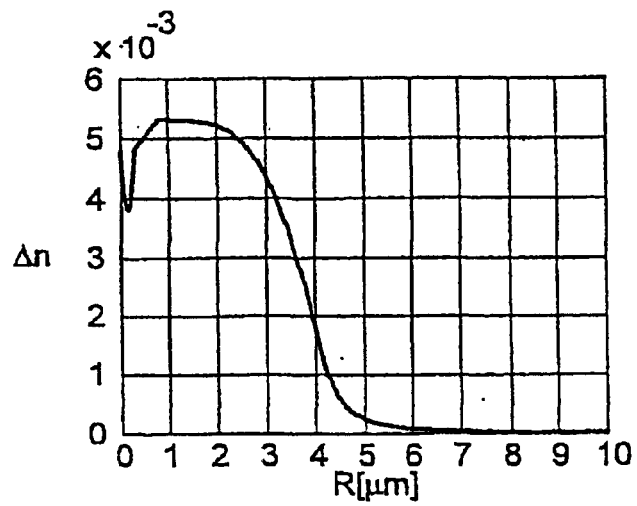
Figure 16A:
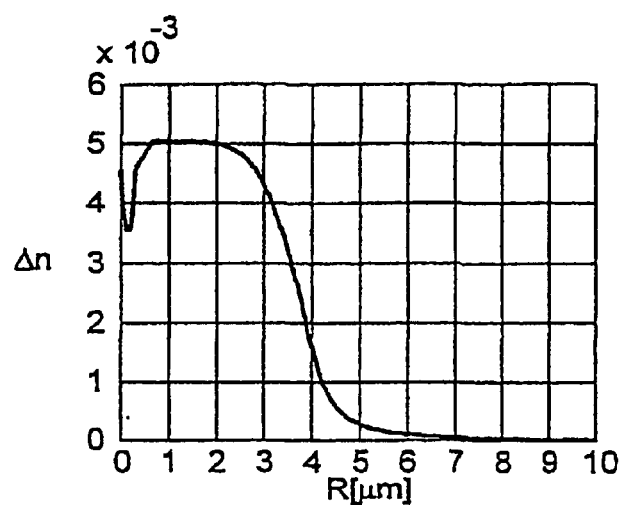
FIGS. 16(a)–(c) show three more examples of refractive index profiles $\Delta n(r)$ of the beta type.
Figure 16B:
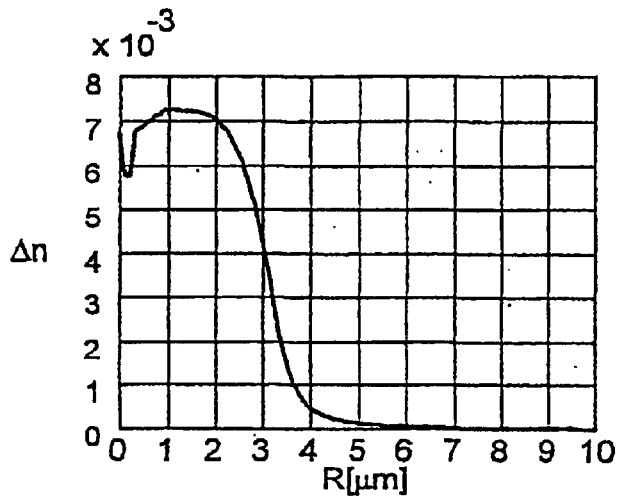
Figure 16C:
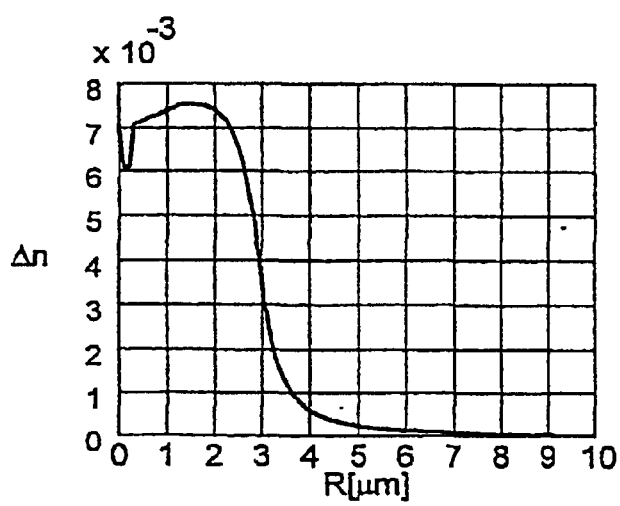
Figure 17A:
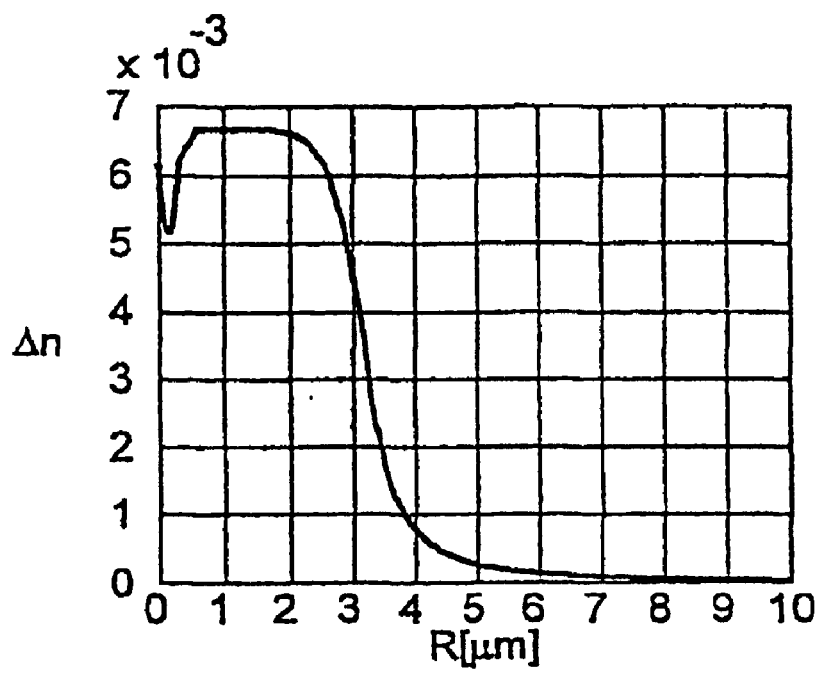
Figure 17B:
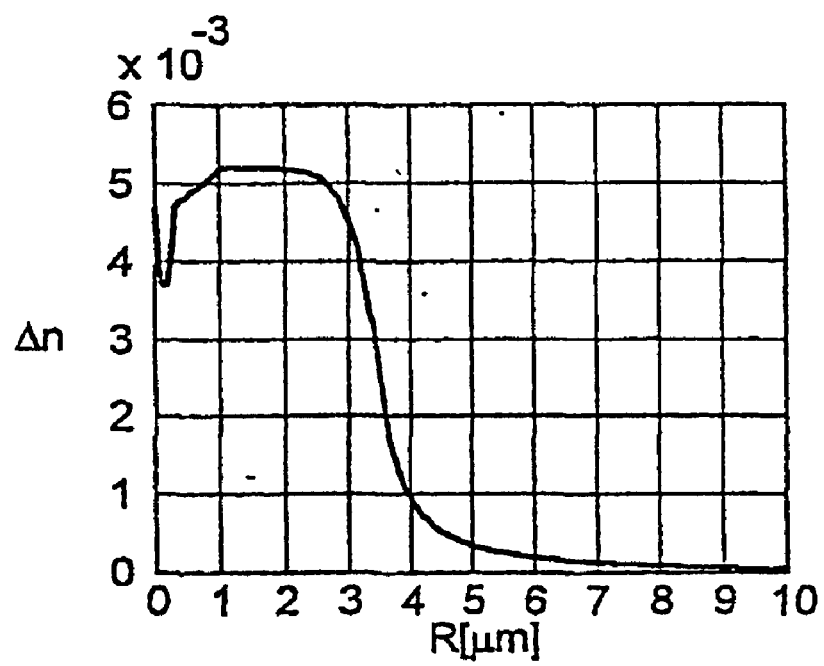

In turn, FIG. 14 shows macro-bending losses (L) at 1550 nm—expressed in dB after 100 turns of fibre wound around a mandrel having a 60-mm diameter—as the semi-area (A) subtended by the profile changes, obtained with the above simulations.

Two areas can be noted in said figure: an upper area, wherein there are comprised the points (A,L) corresponding to the beta profiles having higher macro-bending losses than 0.5 dB after 100 turns of fibre wound around a 60-mm mandrel, and a lower area, wherein there are comprised the points (A,L) corresponding to the beta profiles having lower macro-bending losses than 0.5 dB.

As it can be noted, for an optical fibre having a refractive index profile of the beta type to have lower macro-bending losses than 0.5 dB, the semi-area subtended by the profile must have a higher value than about 0.017 μm. Preferably, the semi-area subtended by the profile has a higher value than about 0.018 μm.

FIGS. 11(a)–(c), 15(a)–(c), 16(a)–(c) and 17(a)–(b), show 11 examples of beta profiles that provide a single-mode propagation at higher wavelengths than about 1260 nm;

a few-mode propagation at about 850;

macro-bending losses at 1550 nm that are less than about 0.5 dB after 100 turns of fibre around a mandrel having a 60-mm diameter; and an intermodal delay $\Delta\tau$ between the fundamental propagation mode $LP_{01}$ and the first higher-order mode $LP_{11}$ at 850 nm that is less than or equal to, about 1 ns/Km.

The main features of the beta profiles shown in FIGS. 11(a)–(c), 15(a)–(c), 16(a)–(c) and 17(a)–(b) are shown in tables 1–4.

TABLE 1

| | FIGURE | | |
|---|---|---|---|
| | 11 (a) | 11 (b) | 11 (c) |
| $\Delta n_0$ | 5.9 * 10⁻³ | 5.8 * 10⁻³ | 6.6 * 10⁻³ |
| a (μm) | 3.5 | 3.6 | 3.4 |
| g | 4 | 2.7 | 3.4 |
| $\Delta\tau$ @ 850 nm (ns/Km) | 0.02 | 0.02 | 0.019 |
| semi-area (μm) | 0.020 | 0.020 | 0.020 |
| normalised frequency V | 3.38 | 3.53 | 3.45 |
| λcutoff $LP_{11}$ (nm) | 1204 | 1244 | 1177 |
| λcutoff $LP_{02}$ (nm) | 808 | 843 | 779 |
| Chromatic dispersion @ 1550 nm [ps/(nm * Km)] | 14.5 | 15.4 | 13.3 |
| MFD @ 850 nm (μm) | 6.5 | 6.8 | 6.2 |
| MFD @ 1550 nm (μm) | 9.8 | 10.2 | 9.3 |
| Macro-bending $LP_{01}$ @ 850 nm (dB after 100 turns with Ø of 60 mm) | <10⁻³ | <10⁻³ | <10⁻³ |
| Macro-bending $LP_{01}$ @ 1550 nm (dB after 100 turns with Ø of 60 mm) | 0.6 * 10⁻³ | 0.9 * 10⁻³ | <10⁻³ |
| Macro-bending $LP_{11}$ @ 850 nm (dB after 100 turns with Ø of 60 mm) | 0.3 * 10⁻³ | 0.2 * 10⁻³ | <10⁻³ |
| Micro-bending @ 1550 nm [(dB/Km)/(g/mm)] | 3.9 | 4.9 | 2.4 |

TABLE 2

| | FIGURE | | |
|---|---|---|---|
| | 15 (a) | 15 (b) | 15 (c) |
| $\Delta n_0$ | 6.8 * 10⁻³ | 5.3 * 10⁻³ | 5.3 * 10⁻³ |
| a (μm) | 3.3 | 3.5 | 3.5 |
| g | 3.5 | 4.0 | 5.7 |
| $\Delta\tau$ @ 850 nm (ns/Km) | 0.03 | 0.01 | 0.03 |
| semi-area (μm) | 0.022 | 0.019 | 0.019 |
| normalised frequency V | 3.47 | 3.24 | 3.23 |
| λcutoff $LP_{11}$ (nm) | 1226 | 1208 | 1177 |
| λcutoff $LP_{02}$ (nm) | 824 | 835 | 792 |
| Chromatic dispersion @ 1550 nm [ps/(nm * Km)] | 13.86 | 15.3 | 14.65 |
| MFD @ 850 nm (μm) | 6.2 | 7.0 | 6.7 |
| MFD @ 1550 nm (μm) | 9.2 | 10.7 | 10.3 |
| Macro-bending $LP_{01}$ @ 850 nm (dB after 100 turns with Ø of 60 mm) | <10⁻³ | <10⁻³ | <10⁻³ |
| Macro-bending $LP_{01}$ @ 1550 nm (dB after 100 turns with Ø of 60 mm) | <10⁻³ | 0.05 | 0.02 |
| Macro-bending $LP_{11}$ @ 850 nm (dB after 100 turns with Ø of 60 mm) | <10⁻³ | 0.06 | 0.04 |
| Micro-bending @ 1550 nm [(dB/Km)/(g/mm)] | 1.9 | 9.0 | 6.9 |

TABLE 3

| | FIGURE | | |
|---|---|---|---|
| | 16 (a) | 16 (b) | 16 (c) |
| $\Delta n_0$ | 5.0 * 10⁻³ | 7.2 * 10⁻³ | 7.5 * 10⁻³ |
| a (μm) | 3.5 | 2.9 | 2.8 |
| g | 6.9 | 7.0 | 8.9 |
| $\Delta\tau$ @ 850 nm (ns/Km) | 0.04 | 0.03 | 0.01 |
| semi-area (μm) | 0.018 | 0.022 | 0.022 |
| normalised frequency V | 3.18 | 3.19 | 3.15 |
| λcutoff $LP_{11}$ (nm) | 1162 | 1162 | 1170 |
| λcutoff $LP_{02}$ (nm) | 783 | 780 | 816 |
| Chromatic dispersion @ 1550 nm [ps/(nm * Km)] | 14.70 | 11.71 | 11.18 |
| MFD @ 850 nm (μm) | 6.8 | 5.7 | 5.6 |
| MFD @ 1550 nm (μm) | 10.5 | 8.7 | 8.6 |
| Macro-bending $LP_{01}$ @ 850 nm (dB after 100 turns with Ø of 60 mm) | <10⁻³ | <10⁻³ | <10⁻³ |
| Macro-bending $LP_{01}$ @ 1550 nm (dB after 100 turns with Ø of 60 mm) | 0.11 | <10⁻³ | <10⁻³ |
| Macro-bending $LP_{11}$ @ 850 nm (dB after 100 turns with Ø of 60 mm) | 0.3 | <10⁻³ | <10⁻³ |
| Micro-bending @ 1550 nm [(dB/Km)/(g/mm)] | 9.1 | 1.4 | 1.25 |

TABLE 4

| | FIGURE | |
|---|---|---|
| | 17 (a) | 17 (b) |
| $\Delta n_0$ | 6.6 * 10⁻³ | 5.1 * 10⁻³ |
| a (μm) | 3.1 | 3.4 |
| g | 9.2 | 10.7 |
| $\Delta\tau$ @ 850 nm (ns/Km) | 0.04 | 0.04 |
| semi-area (μm) | 0.021 | 0.018 |
| normalised frequency V | 3.18 | 3.08 |
| λcutoff $LP_{11}$ (nm) | 1184 | 1151 |
| λcutoff $LP_{02}$ (nm) | 828 | 815 |
| Chromatic dispersion @ 1550 nm [ps/(nm * Km)] | 12.51 | 13.98 |
| MFD @ 850 nm (μm) | 5.9 | 6.6 |
| MFD @ 1550 nm (μm) | 9.1 | 10.4 |
| Macro-bending $LP_{01}$ @ 850 nm (dB after 100 turns with Ø of 60 mm) | <10⁻³ | <10⁻³ |
| Macro-bending $LP_{01}$ @ 1550 nm (dB after 100 turns with Ø of 60 mm) | <10⁻³ | 0.11 |
| Macro-bending $LP_{11}$ @ 850 nm (dB after 100 turns with Ø of 60 mm) | <10⁻³ | 0.58 |
| Micro-bending @ 1550 nm [(dB/Km)/(g/mm)] | 2.1 | 8.7 | where
"MFD" (Mode Field Diameter) refers to the mode field diameter according to the ITU-T G650 standard;
"macro-bending with diameter Ø of 60 mm" refers to the attenuation in dB to which an optical fibre, wound 100 times around a mandrel having a 60-mm diameter, is subject; and
"micro-bending" refers to the attenuation (in dB/Km) introduced by an optical fibre subject to a pressure (expressed in g/mm) on a reference rough surface, measured according to the expansible coil method mentioned above.

From Tables 1–4, it can be noted that the chromatic dispersion values are better than those of the optical fibres according to the ITU-T G652 standard. This is advantageous for an application of the optical fibres on medium-long distance optical communication systems, such as for example, in metropolitan systems.

Moreover, the MFD values are adapted to provide low junction, connecting and coupling losses.

Thus, the optical fibre according to the invention allows implementing, in an effective way, a signal distribution network with opto-electronic components (light sources and detectors) at low cost, operating at about 850 nm, and it is upgradeable to operate in an effective way in a single-mode propagation region at about 1300 and/or 1550 nm.

Figure 1:
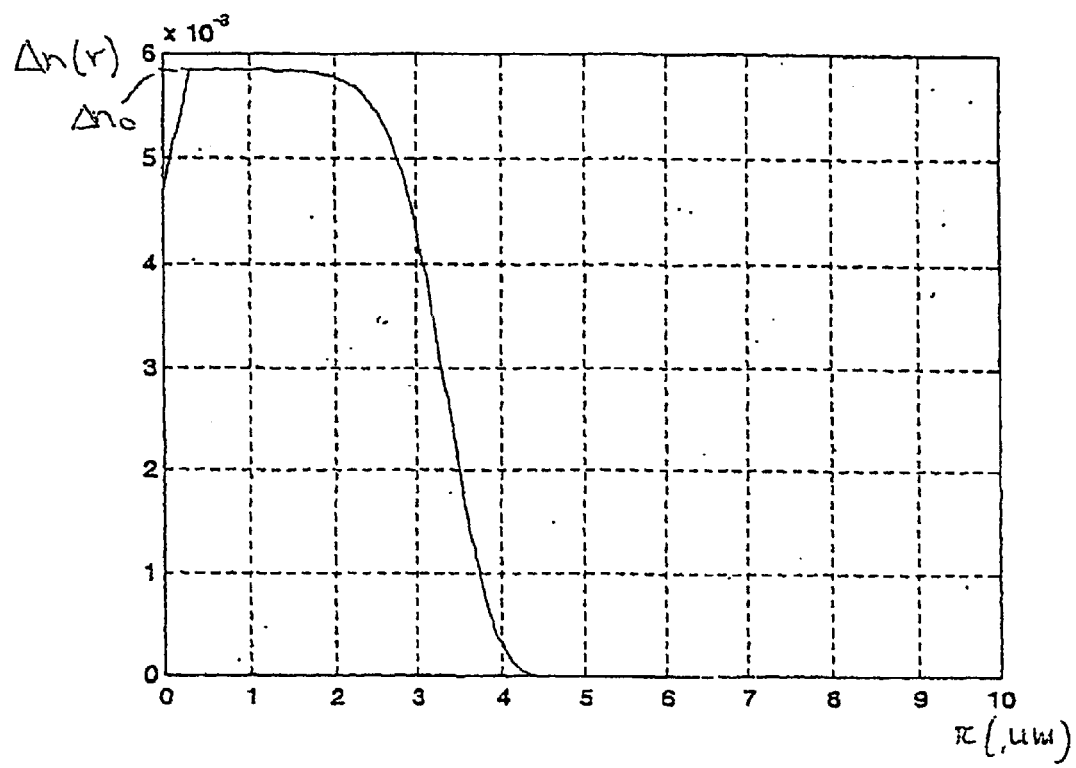
FIG. 1 shows a first example of refractive index profile $\Delta n(r)$ of an optical fibre according to the invention.
Figure 2:
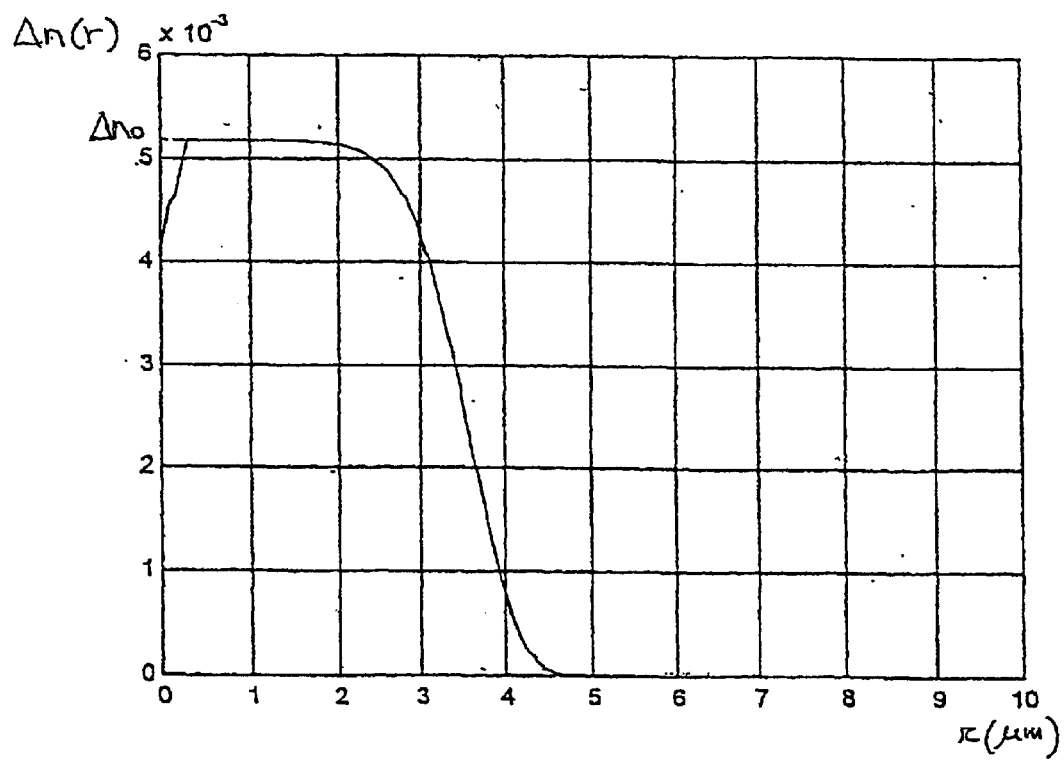
FIG. 2 shows a second example of refractive index profile $\Delta n(r)$ of an optical fibre according to the invention.

FIGS. 1 and 2 show two further examples of refractive index profiles Δn(r) according to the invention, for the optical fibre 10, as the radial distance r from axis xx of the optical fibre 10 changes.

In said figures it can be noted that the refractive index profile takes a lower value than $10^{-4}$ at a value of r equal to about 4.65 μm.

Moreover, the semi-area subtended by the refractive index profiles of FIGS. 1 and 2 has a value respectively equal to 0.19 and 0.0179 μm.

Numerical simulations have shown that the theoretical cutoff wavelength ($\lambda_c$) for the first higher-order propagation mode $LP_{11}$ is of about 1098 nm for the optical fibre of FIG. 1, and of about 1095 nm for the optical fibre of FIG. 2. In turn, the theoretical cutoff wavelength ($\lambda_c$) for the second higher-order propagation mode $LP_{02}$ is of about 715 nm for the optical fibre of FIG. 1 and of about 714 nm for the optical fibre of FIG. 2.

The optical fibres 10 having the refractive index profiles of FIGS. 1 and 2 thus allow a single-mode propagation of optical signals in the second and in the third transmission window (respectively centred around the wavelengths of about 1310 nm and 1550 nm) and a two-mode propagation (of the fundamental mode $LP_{01}$ and of the first higher-order mode $LP_{11}$) at about 850 nm.

Numerical simulations of the propagation of optical signals in optical fibre have shown that, in the two-mode propagation condition (at a signal wavelength of about 850 nm) of the optical fibres having the refractive index profiles of FIGS. 1 and 2 the difference Δτ of the propagation delay of the two modes $LP_{01}$ and $LP_{11}$ is equal: to 0.34 ns/Km in the case of FIG. 1 and 0.23 ns/Km in the case of FIG. 2; and the attenuation due to macro-bending calculated on a fibre wound 100 times around a mandrel having a 60-mm diameter for mode $LP_{01}$ is of about 0.059 dB/Km in the case of FIG. 1 and of about 1.17 dB/Km in the case of FIG. 2.

Thus, said optical fibres allow implementing in an effective way a signal distribution network with opto-electronic components (light sources and detectors) at a low cost, operating at about 850 nm.

Moreover, the numerical simulations have shown that, in the single-mode propagation condition (at the signal wavelengths of about 1310 and 1550 nm) the optical fibres having the refractive index profiles of FIGS. 1 and 2 have the features respectively summarised in Tables 5 and 6.

TABLE 5

|  | @ 1310 nm | @ 1550 nm |
|---|---|---|
| Chromatic dispersion (ps/(nm * Km)) | −4.2 | 12.5 |
| Chromatic dispersion slope (ps/(nm² * Km)) | 0.085 | 0.059 |
| MFD (μm) | 8.25 | 9.66 |
| Effective area (μm²) | 51.5 | 69.3 |
| Macro-bending (dB) - Ø di 60 mm | <$10^{-3}$ | 0.02 |
| Micro-bending (dB/Km)/(g/mm) | 0.8 | 2.8 |

TABLE 6

|  | @ 1310 nm | @ 1550 nm |
|---|---|---|
| Chromatic dispersion (ps/(nm * Km)) | −3.4 | 13.4 |
| Chromatic dispersion slope (ps/(nm² * Km)) | 0.086 | 0.059 |
| MFD (μm) | 8.76 | 10.26 |
| Effective area (μm²) | 58.0 | 78.2 |
| Macro-bending (dB) - Ø di 60 mm | <$10^{-3}$ | 0.34 | where "effective area" is defined according to the ITU-T G650 standard.

From Tables 5 and 6 it can be noted that the macro-bending value is in both cases less than 0.5 dB after 100 turns of fibre wound around a mandrel having a 60-mm diameter.

Moreover, from Tables 5 and 6 it can be noted that the chromatic dispersion and the chromatic dispersion slope values are comparable to, or better than, the optical fibres according to the ITU-T G652 standard. This is advantageous for an application of the optical fibres on medium-long distance optical communication systems, such as for example, in metropolitan systems.

Advantageously, the chromatic dispersion at 1550 nm has a value lower than or equal to one of the following values: 20, 19, 18, 17, 16 ps/(nm*Km), listed in order of ascending preference.

Moreover, the MFD and effective area values are adapted to guarantee low junction, connecting and coupling losses.

The optical fibres according to the invention thus allow implementing in an effective way a signal distribution network with opto-electronic components (light sources and detectors) at low cost, operating at about 850 nm and upgradeable to operate in a single-mode propagation region at about 1300 and/or 1550 nm.

Figure 10:
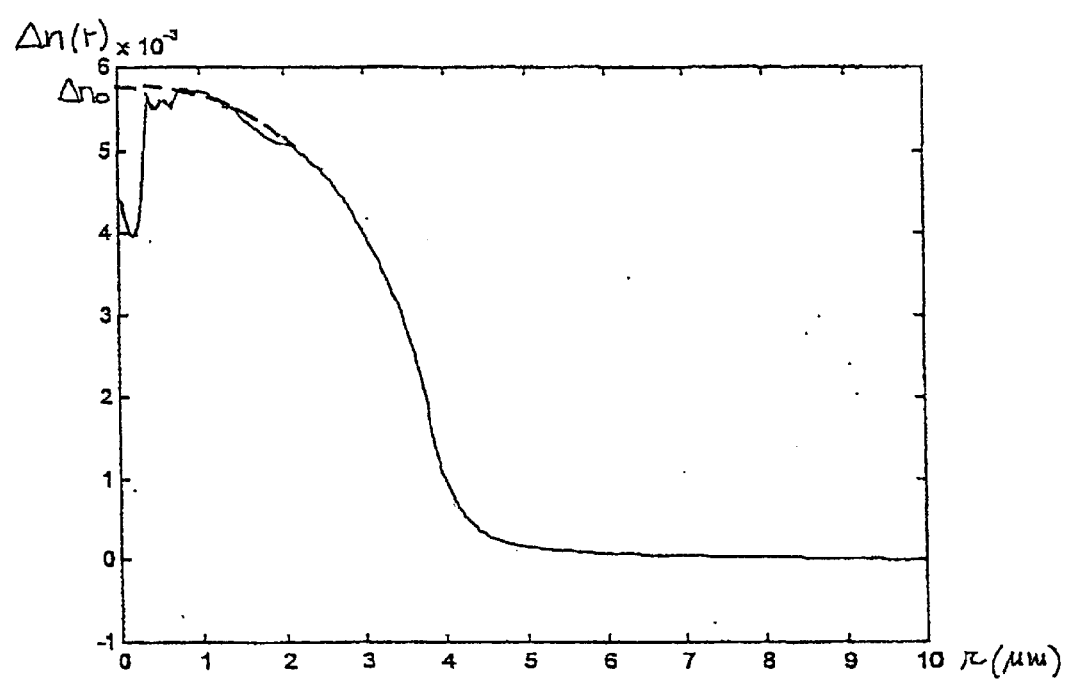
FIG. 10 shows a refractive index profile $\Delta n(r)$ of an optical fibre according to the invention made by the Applicant.
Figure 11A:
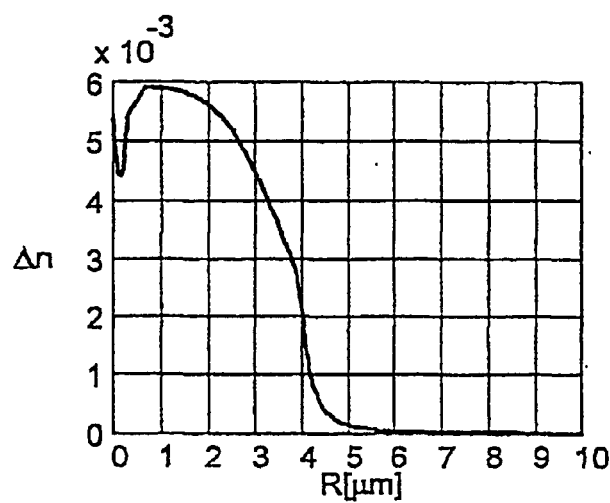
FIGS. 11(a)–(c) show three examples of refractive index profiles $\Delta n(r)$ of the beta type.
Figure 11B:
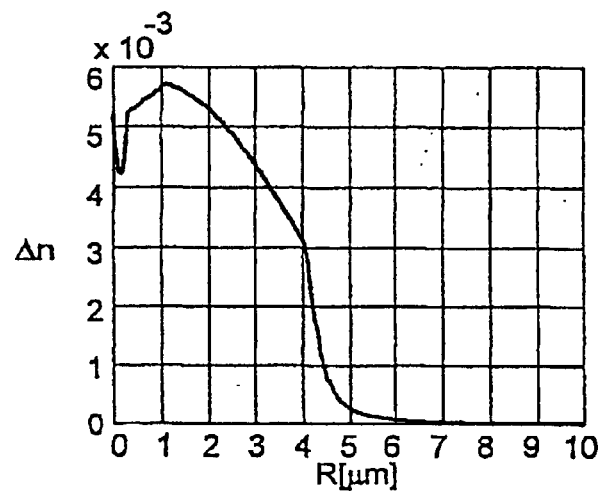
Figure 11C:
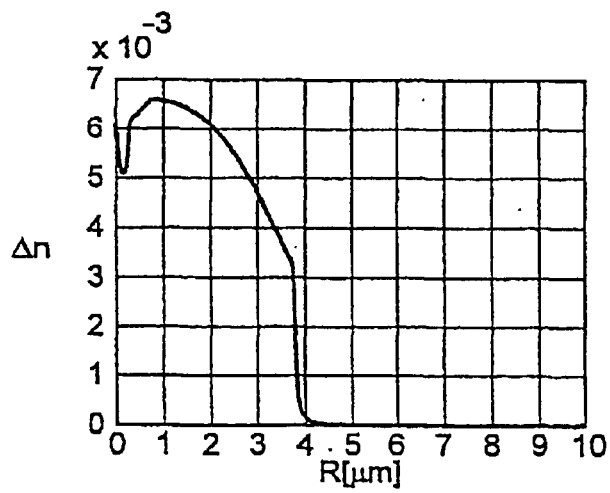

FIG. 10 shows the actual refractive index profile Δn(r), experimentally measured, of an optical fibre 10 according to the invention, produced by the Applicant.

As it can be noted, said profile is similar to a profile of the beta type.

The semi-area subtended by this index profile is of about 0.0186 μm.

Experimental measures performed on the optical fibre having the index profile of FIG. 10 have shown that the 2-m fibre cutoff wavelength (ITU-T G652) for the first higher-order propagation mode $LP_{11}$ of said fibre is of about 1069 nm, whereas the 2-m fibre cutoff wavelength (ITU-T G652) for the second higher-order propagation mode $LP_{02}$ is of about 690 nm.

Moreover, experimental measures have shown that, in the two-mode propagation condition (at a signal wavelength of about 850 nm) of the optical fibre having the refractive index profile of FIG. 10, the difference Δt of the propagation delay of the two modes $LP_{01}$ and $LP_{11}$ is of about 0.8 ns/Km;

the attenuation due to macro-bending, calculated on a fibre wound one turn around a mandrel having a 40-mm diameter is of about 0.28 dB for mode $LP_{11}$, and it is negligible for mode $LP_{01}$; and the attenuation due to macro-bending, calculated on a fibre wound one turn around a mandrel having a 32-mm diameter is of about 0.42 dB for mode $LP_{11}$, and it is negligible for mode $LP_{01}$.

On the other hand, as regards the single-mode propagation condition (at the signal wavelengths of about 1310 and 1550 nm), experimental measures have shown that the optical fibre having the refractive index profile of FIG. 10 has the features summarised in Table 7.

TABLE 7

|  | @ 1310 nm | @ 1550 nm |
|---|---|---|
| Chromatic dispersion (ps/(nm * Km)) | −3.6 | 13.2 |
| Chromatic dispersion slope (ps/(nm² * Km)) | 0.089 | 0.055 |
| MFD (μm) | 8.7 | 10.1 |
| Macro-bending after 100 turns with Ø of 60 mm (dB) | <10⁻³ | 0.2 |
| Macro-bending after 1 turn with Ø of 40 mm (dB) | <10⁻³ | 0.15 |
| Macro-bending after 1 turn with Ø of 32 mm (dB) | <10⁻³ | 0.37 |
| Micro-bending (dB/Km)/(g/mm) | 0.9 | 7.5 |
| Attenuation (dB/Km) | 0.38 | 0.199 |

From Table 7 it can be noted that the macro-bending value measured after 100 turns of fibre wound on a 60-mm diameter mandrel is less than 0.5 dB.

Moreover, from Table 7 it can be noted that the optical fibre having the refractive index profile of FIG. 10 has chromatic dispersion and chromatic dispersion slope values comparable to, or better than, the optical fibres according to the ITU-T G652 standard.

Moreover, the MFD and effective area values are such as to guarantee low junction, connecting and coupling losses.

The optical fibre of the invention thus allows implementing in an effective way a signal distribution network with opto-electronic components (light sources and detectors) at low cost, operating at about 850 nm, and it is upgradeable to operate in an effective way in a single-mode propagation region at about 1300 and/or 1550 nm.

Experimental measures have been performed on a cable long about 60 m, comprising an optical fibre having the index profile of FIG. 10, inserted into a test raceway simulating a winding path typical of an installation in a building.

Said experimental tests have shown that the optical fibre has a total attenuation of 0.2 dB at 1550 nm.

Moreover, experimental measures have been performed, adapted to measure—in the presence of thermal cycles—the attenuation of the optical fibre having the index profile of FIG. 10 arranged in an optical cable. Said experimental tests have shown that the attenuation values (dB/Km) of said fibre at 1310 and 1550 nm agree with the values provided by the ITU-T standard.

For an actual refractive index profile (such as for example, that of FIG. 10) having, as the beta profile, a small dip at the centre of core 14 (typical of the OVD production process), a central portion with a pattern similar to a super-Gaussian and an external tail, the Applicant has found that it is possible to determine parameters g, V, a and $\Delta n_0$ according to the steps disclosed below:

a) filtering the actual profile measured by the measurement noise, for example with a low-pass filter (numerical), or with a moving average process;

b) determining the radius r_dip that defines the maximum extension of the small dip. Typically, it can be determined as the radius to which corresponds the maximum value taken by the profile ($\Delta n_{massimo}$) Said radius r_dip typically ranges between about 0.3 and 2.5 micron;

c) determining the radius r_max to which corresponds the minimum $\Delta n$ measurable of the profile, according to the sensitivity of the instrument. Typically, $\Delta n=0.0001$;

d) performing an interpolation according to the best fit method of the measured profile between r_dip and r_max using the family of super-Gaussian functions $\Delta n(r)=\Delta n_0 \exp[-(\frac{1}{2})(r/a)^g]$ as parameters $\Delta n_0$, a, g change. The interpolation process allows determining the values of the three parameters that minimise the deviation between a super-Gaussian and the measured profile.

e) calculating $V=(2\pi a/\lambda)\sqrt{2^*(n\Delta n_0)}$.

For example, by applying this method to the actual index profile of FIG. 10, the following values of g, V, a and $\Delta n_0$ have been obtained:

g=3.85 a=3.27 (μm)

$\Delta n_0=5.62*10^{-3}$

V=3.09

From FIG. 13, it can be noted that the point (V=3.09; g=3.85) is into the area delimited by lines 502.

The above method can be used also for an actual refractive index profile of the beta type without the small dip. In this case, step b) must be omitted, and step d) must be performed on the profile measured between r=0 and r_max.

The optical fibre 10 of the invention is adapted to be used in a network for distributing signals to a plurality of user equipment.

Figure 3:
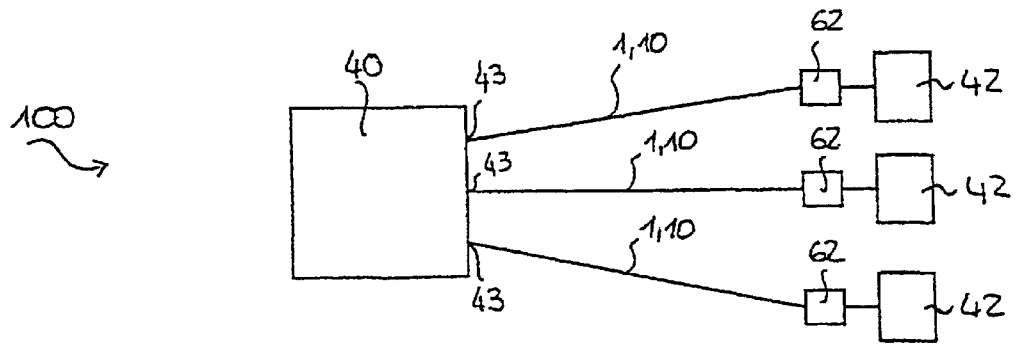
FIG. 3 shows a schematic view of a signal distribution network according to the invention.

FIG. 3 shows an embodiment according to the invention, of a network 100 for distributing signals to a plurality of user electrical equipment 42 comprising a distribution unit 40, a plurality of optical cables 1 and a plurality of opto-electronic conversion devices 62.

For simplicity of illustration, in the embodiment of FIG. 3 there are shown three optical cables 62 and three user electrical equipment 42.

The optical cables 1 make the distribution unit 40 communicate with the user electrical equipment 42.

More in particular, the optical cables 1 are connected to three optical input/output ports 43 of the distribution unit 40 for transporting optical signals from said unit towards the opto-electronic conversion devices 62. Said opto-electronic conversion devices 62 comprise a conventional photodetector (not shown) for converting optical signals coming from the distribution unit 40 into corresponding electrical signals, and sending them to the corresponding user electrical equipment 42.

Typically, the opto-electronic conversion devices 62 also comprise devices intended to adapt the electrical signals in output from the photodetectors according to the physical requirements and to the protocols required by the user equipment 42, for example, the internet protocol, or the typical protocols of digital or analog television signals, or of telephone signals.

Moreover, the optical cable 1 comprises at least one optical fibre 10 according to the invention.

One of the two ends of the optical fibre 10 is coupled to an optical port of the photodetector of the opto-electronic conversion device 62, whereas the other end is coupled to one of the optical ports 43 of said distribution unit 40.

According to a variant, the optical cables 1 are advantageously bi-directional, so as to allow a propagation of signals from the user electrical equipment 42 to the distribution unit 40, and from the distribution unit 40 to the user equipment 42.

In the bi-directional case, each opto-electronic conversion device 62 comprises both a conventional laser source for converting electrical signals coming from the user equipment 42 into corresponding optical signals and sending them, through the optical cables 1, to the distribution unit 40, and a photodetector for converting optical signals coming from the distribution unit 40 into corresponding electrical signals, and providing them to the user electrical equipment 42.

Typically, the laser sources emit an electromagnetic radiation that is amplitude modulated by modulating the laser supply current, or through conventional amplitude modulators according to the information carried by the electrical signals coming from the user equipment 42.

Moreover, in the bi-directional case, each optical cable 1 typically has a first and a second optical fibre 10 according to the invention. The first optical fibre is connected to the laser source of the opto-electronic conversion device 62, and is adapted to transmit optical signals from the corresponding user equipment 42 to the distribution unit 40. In turn, the second optical fibre is connected to the photodetector of the opto-electronic conversion device 62 and is adapted to transmit optical signals from the distribution unit 40 to the corresponding user equipment 42.

According to a variant, each optical cable 1 has a single optical fibre 10 according to the invention, adapted to transmit the optical signals in the two directions and connected, through a conventional optical coupler or a conventional optical circulator, both to the laser source and to the photodetector of the opto-electronic conversion device 62.

According to another variant, the optical signals travelling in the two directions have different wavelengths, and the couplers advantageously are wavelength selective, such as for example, conventional wavelength multiplexing/demultiplexing devices.

In this last variant, the two different wavelengths in the two propagation directions of the optical signals can, for example, be selected as one below the cutoff wavelength for the first higher-order mode $LP_{11}$ of the optical fibre 10, so as to operate in a few-mode propagation condition, and the other one above the cutoff wavelength for the first higher-order mode $LP_{11}$ of the optical fibre 10 so as to operate in a single-mode propagation condition. For example, in the case of optical fibres 10 having the refractive index profiles of FIGS. 1, 2 and 10, the two wavelengths can be of about 850 and 1310 or 1550 nm.

In case of few-mode propagation condition of the optical fibre 10, the laser source of the opto-electronic conversion devices 62 is, for example, a laser source of the VCSEL (vertical cavity surface emitting laser) type with emission at the wavelength of about 850 nm.

In turn, the photodetector of the opto-electronic conversion devices 62 is, for example, a conventional photodiode of the PIN type with reception in a band of wavelengths centred at about 850 nm.

Said types of laser and photodetector are available on the market at a low price.

In the case of single-mode propagation condition of the optical fibre 10, the laser source is, for example, a conventional laser of the Fabry-Perot type, or a conventional semiconductor laser of the DFB or DBR type, with emission in the bands of 1300–1350 nm or 1480–1625 nm.

In an example, for covering a transmission up to 5 km at a wavelength of about 850 nm, a higher power than −20 dBm, in particular of about −16 dBm, has been coupled in the optical fibre 10.

In the example, the sensitivity of the photodetector was better than −32 dBm, in particular, about −34 dBm.

Thus, the available optical power (power budget) on the link in optical fibre 10 of the example was higher than 12 dB, in particular, it was of about 18 dB.

The laser sources and the photodetectors of the opto-electronic conversion devices 62 typically are connected to the optical fibres 10 of the invention through conventional optical connectors.

Opto-electronic conversion devices 62 are connected to the respective user electrical equipment 42 through electrical cables (not shown), preferably through connectors.

Electrical cables typically are of the conventional UTP-5 type, typically terminated with conventional connectors of the RJ-45 type, or conventional coaxial cables with corresponding connectors.

Besides the optical fibres 10, the optical cables 1 also comprise a plastic coating for coating the fibres, and an outside plastic sheath.

Moreover, between the plastic coating of the optical fibres 10 and the outside plastic sheath, the optical cables 1 also comprise a strength member, such as for example a plurality of longitudinal yarns made of Kevlar™ (not shown), which are flexible and tensile-strength resistant.

For example, the optical cables 1 are of the type disclosed in the patent application EP 0 829 742 filed by the Applicant, or they are of the ribbon type.

According to a variant, the optical cables 1 also comprise one or more electrical conductors adapted, for example, to carry a supply current.

Nevertheless, the variant of optical cables 1 without electrical conductors is preferred as it has the advantage of being inserted into the same raceways used for electrical energy distribution without any electrical safety problems.

Figure 4:
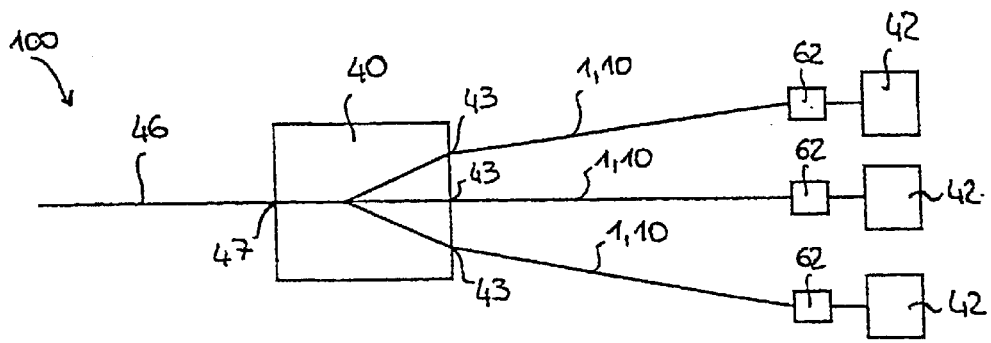
FIG. 4 shows a schematic view of a first embodiment of a signal distribution network of the invention.

In the embodiment of FIG. 4, the distribution network 100 is adapted to send optical signals (preferably carrying digital information) coming from an optical-fibre line 46 to the user electrical equipment 42.

In this embodiment, the distribution unit 40 is an optical apparatus comprising, for example, a conventional splitter adapted to route the optical signals coming from the optical fibre line 46 to the three optical input/output ports 43.

In this embodiment, the optical fibres 10 of the three optical cables 1 preferably are fastened to the optical ports 43 of said distribution unit 40 through a fusion joint.

According to a variant, said optical fibres 10 are mechanically connected to the optical ports 43 of said distribution unit 40 through conventional optical connectors.

Figure 5:
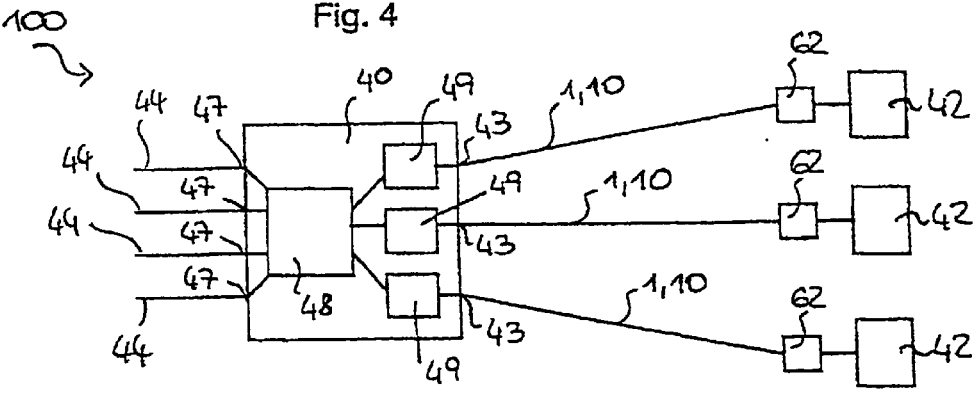
FIG. 5 shows a schematic view of a second embodiment of a signal distribution network of the invention.

In the embodiment of FIG. 5, the distribution network 100 is similar to that of FIG. 4 except in that the distribution unit 40 is adapted to comprise opto-electronic equipment 48 and 49.

More in particular, the distribution unit 100 is adapted to receive, from a plurality of electrical input/output ports 47, a plurality of electrical input signals (preferably of the digital type) coming from a plurality of electrical cables 44; to send them to an electrical processing unit 48 that processes them according to the applications; to provide a plurality of electrical output signals; to transform them into corresponding optical signals through opto-electronic converters 49; to provide them to the optical input/output ports 43 and to send them, through transmission on the optical cables 1, to the opto-electronic conversion devices 62 and thus, to the user electrical equipment 42.

Moreover, the distribution unit 40 is also advantageously adapted to receive from the optical ports 43 the optical signals coming—through the optical cables 1—from the user equipment 42; to convert them into corresponding electrical signals through the opto-electronic converters 49; to send them to the electrical processing unit 48, which processes them according to the applications, and to provide a plurality of electrical output signals to the electrical input/output ports 47.

The electrical processing unit 48, for example, is adapted to demodulate the electrical digital signals coming from the input/output ports 47, to amplify them and optionally, to modulate them according to a conventional modulation format and/or to select the signal(s) to be sent on each optical cable 1. Moreover, it is also adapted, for example, to demodulate electrical digital signals coming from the opto-electronic converters 49, to amplify them and optionally, to modulate them according to a conventional modulation format and/or to select the signal(s) to be sent on each input/output port 47.

Typically, opto-electronic converters 49 comprise laser sources emitting an electromagnetic radiation that is modulated in amplitude by modulating the laser supply current, or through conventional amplitude modulators according to the information carried by the electrical signals in output from said processing unit 48.

Moreover, in the bi-directional case, they advantageously comprise also conventional photodetectors adapted to receive the optical signals coming from the optical ports 43; to convert them into corresponding electrical signals, and to provide them to the processing unit 48.

In the case of few-mode propagation condition of the optical fibre 10, the laser source of the opto-electronic converters 49 is for example a laser source of the VCSEL type, with emission at the wavelength of about 850 nm.

In turn, the photodetector of the opto-electronic converters 49 is, for example, a conventional photodiode of the PIN type, with reception in a band of wavelengths centred around 850 nm.

Said types of laser and photodetector are available on the market at a low price.

In the case of single-mode propagation condition of the optical fibre 10, the laser source is, for example, a conventional laser of the Fabry-Perot type, or a conventional semiconductor laser of the DFB or DBR type with emission in the bands of 1300–1350 nm or 1480–1625 nm.

In turn, the photodetector is, for example, a conventional photodiode of the PIN type with reception in the band of wavelengths of 1300–1350 nm or 1480–1625 nm.

The laser sources and the photodetectors of the opto-electronic converters 49 are typically connected to the optical fibres 10 of the invention through conventional optical connectors.

Figure 6:
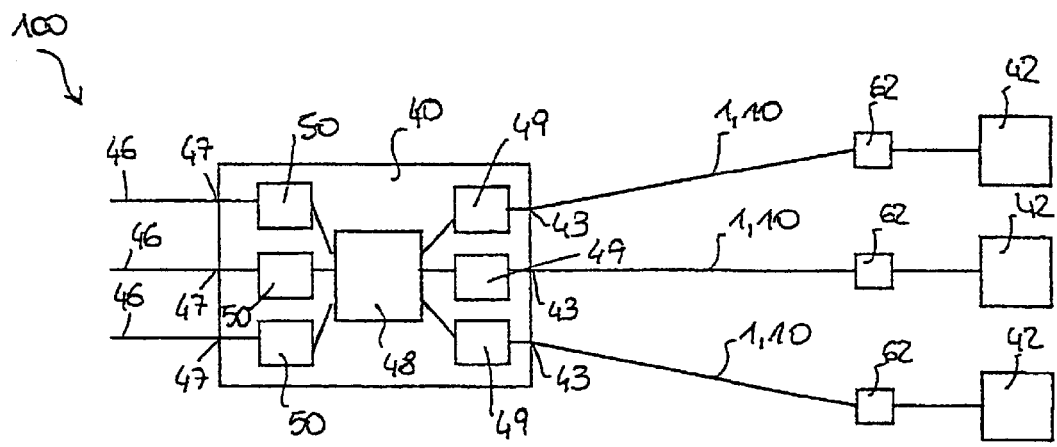
FIG. 6 shows a schematic view of a third embodiment of a signal distribution network of the invention.

In the embodiment of FIG. 6, the distribution network 100 is similar to that of FIG. 5 except in that the distribution unit 40 also comprises opto-electronic converters 50, and the input/output ports 47 are optical ports instead of being electrical.

More in particular, the distribution unit 40 is adapted to receive in input to the plurality of optical input/output ports 47 a plurality of optical signals (preferably carrying digital information) coming from a plurality of optical fibres 46; to convert said optical signals into corresponding electrical signals through the opto-electronic converters 50; to send them to the electrical processing unit 48 that processes them according to the application and provides a plurality of electrical signals in output; to transform said electrical signals into corresponding optical signals through the opto-electronic converters 49; to provide said optical signals to the optical input/output ports 43 and to send them, through transmission on the optical cables 1, to the user electrical equipment 42.

Moreover, the distribution unit 40 is also advantageously adapted to receive, from the optical ports 43, the optical signals coming—through a transmission on the optical cables 1—from the user equipment 42; to convert them into corresponding electrical signals through the opto-electronic converters 49; to send them to the electrical processing unit 48 that processes them; to provide a plurality of digital electrical signals to the opto-electronic converters 50 which convert them into corresponding optical signals; to provide said optical signals to the input/output ports 47 and to send them along the plurality of optical fibres 46.

Figure 7:
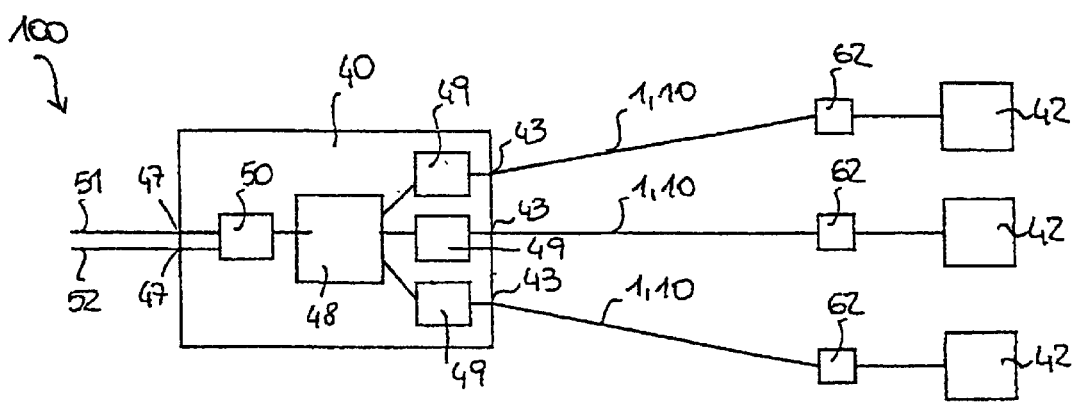
FIG. 7 shows a schematic view of a variant to the third embodiment of FIG. 6.

FIG. 7 shows an example of the embodiment of FIG. 6 wherein network 100 is a network for distributing digital signals to a plurality of users according to a Fastethernet™ 100 Mbit/s protocol. Said signals arrive in optical form to an optical port 47 from an optical input fibre 51 and they are converted into corresponding electrical signals by an opto-electronic converter 50. The electrical signals are processes by the processing unit 48, which is adapted to select the digital signal intended for each user (for example, a digital signal according to an Ethernet™ 10 Mbit/s protocol) and to send it to a corresponding opto-electronic converter 49. Said converter converts the digital electrical signal intended for the user into a corresponding optical signal, and sends it to the electrical equipment 42 of that user through the relevant optical cable 1.

Moreover, in this variant of FIG. 7, each user electrical equipment 42 is adapted to send a digital signal according to an Ethernet™ 10 Mbit/s protocol to the distribution unit 40. Each digital signal coming from the optical cables 1 to one of the optical ports 43 is converted into a corresponding electrical signal by the relevant opto-electronic converter 49, and sent to the processing unit 48, which processes it according to the applications. The latter, among the other things, time multiplexes the above signals coming from the different user equipment 42, and provides a single time multiplexed electrical signal, according to the Fastethernet™ 100 Mbit/s protocol to the opto-electronic converter 50. Said converter 50 converts said multiplexed electrical signal into a corresponding optical signal, and sends it to an optical port 47 connected to an optical output fibre 52.

In the example of FIG. 7, the processing unit 48 is, for example, a ROUTER CATALYST 2900 XL produced by CISCO SYSTEMS.

Figure 12:
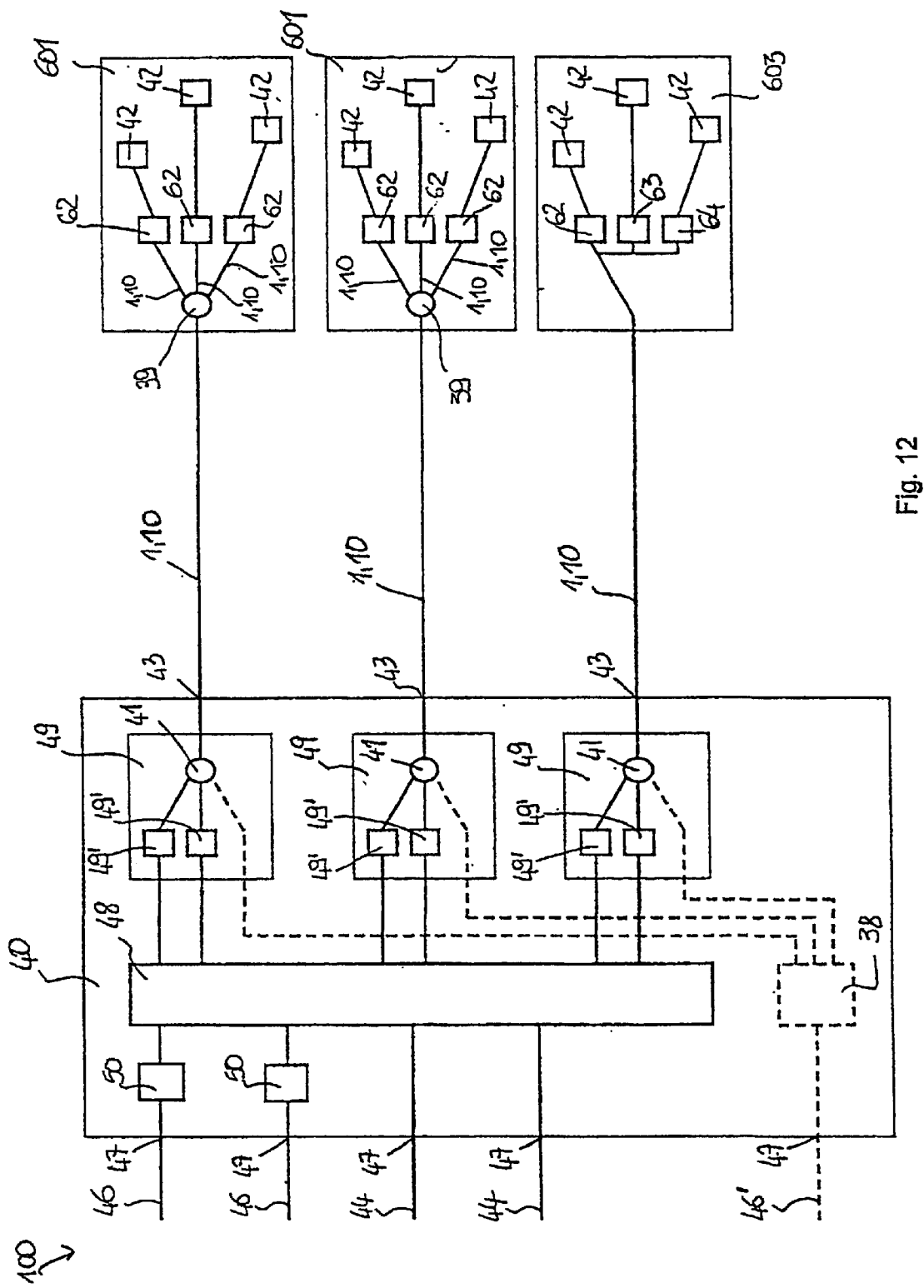
FIG. 12 shows a schematic view of a fourth embodiment of a signal distribution network of the invention.

In the embodiment of FIG. 12, the distribution network 100 is similar to that of FIG. 6 except in that the distribution unit 40 also comprises electrical input/output ports 47 and domestic (or house) networks 601 and 603, besides the building or local network consisting of the plurality of optical cables 1 extending between the distribution network 40 and the domestic networks 601, 603.

More in particular, the distribution unit 40 is adapted to receive in input to the plurality of input/output ports 47, a plurality of optical signals (preferably carrying digital information) coming from a plurality of optical fibres 46, 46', and a plurality of electrical signals (preferably digital as well) coming from a plurality of electrical cables 44.

The signals carried by the different electrical cables 44 and optical fibres 46, 46' are, for example, signals coming from different providers, such as for example telephone, television and internet service providers.

The optical signals coming from the optical fibres 46 are converted into corresponding electrical signals by the opto-electronic converters 50, and sent to the electrical processing unit 48. The latter processes the electrical signals coming from the opto-electronic converters 50 and those coming from the electrical cables 44 according to the applications, and provides a number of electrical signals to each opto-electronic combiner 49.

More in particular, the electrical processing unit 48 provides to each opto-electronic combiner 49 the signals that from time to time are intended for the user associated to it, and that come from the various providers.

In turn, each opto-electronic combiner 49 is adapted to transform (through opto-electronic converters 49') the electrical signals in input to it, coming from the various providers, into corresponding optical signals at different wavelengths (typically, a wavelength for each provider or for each service type); to multiplex them in wavelength through a conventional wavelength selective or not, coupler 41; to provide the wavelength division multiplexed (or WDM) optical signal to the input/output optical port 43, and to send it to the user associated to it through transmission on optical fibre 10 of the optical cable 1.

In turn, the optical signal coming from the optical fibre 46', having a predetermined wavelength (different from those associated to the other providers or services in the distribution network), is split in power by a conventional optical coupler 38, and sent directly to couplers 41, which multiplex it together with the other signals at different wavelengths.

Although a single optical fibre 46' and a single optical coupler 38 are indicated in FIG. 12, the network can comprise more optical couplers 38 for the connection to a corresponding number of optical fibres 46' associated to different providers or services.

The WDM signal in output from each opto-electronic combiner 49 is sent, through optical cable 1, to the corresponding domestic network 601, 603.

The domestic network 601 is of the star type, and it comprises a coupler 39, a plurality of optical cables 1 and a plurality of opto-electronic conversion devices 62 adapted to be connected to a plurality of electrical user equipment 42 arranged, for example, in the various rooms of the user's house. For example, said user equipment 42 can be telephones, television sets and/or Personal Computers.

According to an embodiment, coupler 39 is a conventional optical beam splitter which splits the optical power of the input WDM optical signal between its outputs that are connected to the optical cables 1 associated to the various user equipment 42. Moreover, each opto-electronic conversion device 62—besides comprising a conventional photodetector and optionally, in case of bi-directional propagation, a light source—also comprises an optical filter adapted to extract, from the WDM optical signal, the wavelength carrying the information associated to the user equipment corresponding to it, and to send it to the photodetector. This filter can be fixed, or automatically or manually tunable, for example through mechanical, thermal or electrical control. The use of tunable filters allows arranging universal modules for the opto-electronic conversion device 62, which can from time to time be used at the desired wavelength. Said modules can also comprise electronic circuits for signal protocols conversion, according to the protocols of the user equipment 42.

According to a variant, coupler 39 is a conventional wavelength demultiplexing device adapted to demultiplex the incoming input WDM optical signal into a plurality of optical signals at different wavelength, and to route them to the optical cables 1 associated to the various user equipment 42. In this case, a preselected wavelength reaches each opto-electronic conversion device 62, and the presence of an optical filter is not necessary anymore.

The domestic network 603 is of the bus type. It is totally similar to the domestic network 601 except in that the WDM signal arriving from the optical cable 1 connected to it is sent to the opto-electronic conversion device 62; the latter processes the WDM signal and sends it to the opto-electronic conversion device 63 which, in turn, processes the WDM signal and sends it to the opto-electronic conversion device 64.

More in particular, each opto-electronic conversion device 62, 63, 64 has a filter of the type disclosed above, for extracting, from the input WDM optical signal, the wavelength carrying the information associated to the user-equipment corresponding to it, and sending it to the photodetector.

In a variant, each opto-electronic conversion device 62, 63, 64 is adapted to tap a power fraction from the input WDM optical signal, extracting the desired wavelength from said power fraction and sending the remaining power fraction of the WDM optical signal to the opto-electronic conversion device connected to it. According to an alternative variant, each opto-electronic conversion device 62, 63, 64 is adapted to extract directly from the input optical signal the desired wavelength, thus sending the WDM optical signal with the remaining wavelengths to the opto-electronic conversion device connected to it.

At first, when band requirements are not high, the WDM transmission on the optical fibre 10 of the optical cable 1 can be advantageously implemented in the few-mode propagation region at about 850 nm. For example, the wavelengths of the plurality of wavelength multiplexed optical signals can be selected in a band comprised between 820–870 nm with a spacing of 20 nm, 10 nm, 5 nm or 2 nm.

At a later time, when band requirements are higher, the WDM transmission can be implemented in the single-mode propagation region of the optical fibre 10 and the wavelengths of the plurality of wavelength multiplexed optical signals can be selected in a band comprised, for example, between 1300–1350 nm and/or 1480–1625 nm with a spacing of 20 nm, 10 nm, 5 nm or 2 nm.

Moreover, the WDM transmission can be implemented both in the few-mode propagation region and in the single-mode propagation region of the optical fibre 10.

As regards the transmission on optical fibre 10 from the user side to the distribution unit 40 side of the distribution network of FIG. 12, it can be implemented through a WDM transmission in a totally similar way to that previously disclosed for the transmission from the distribution unit 40 side to the user side. Nevertheless, since the quantity of information transmitted from the user side to the distribution unit 40 side is limited (typically, it is aimed towards controlling and/or selecting the information received), the transmission on optical fibre 10 from the user side to the distribution unit 40 side is preferably carried out according to a conventional less expensive time division multiplexing (or TDM) transmission. In this case, the distribution network also comprises, at each user side, a conventional TDM transmission management electronics.

It is possible to use one or more of the available wavelengths for the transmission, from the distribution unit 40 to the user equipment 42, of a service channel for handling failure and/or alarm situations, and/or for allowing the synchronisation of TDM transmissions in the opposed direction. Said service channel is actuated into the distribution unit 40 through a suitable control electronics and an electro-optical converter, and it is distributed to each opto-electronic conversion device 62 through power splitting.

In general, the signal distribution network 100 of the invention can be used for distributing to a plurality of electronic user equipment 42 a plurality of television and/or telephone and/or internet digital signals coming from a long-distance satellite and/or coaxial cable and/or optical fibre and/or air transmission.

Moreover, for example, it can be used in LAN distribution networks.

Figure 8:
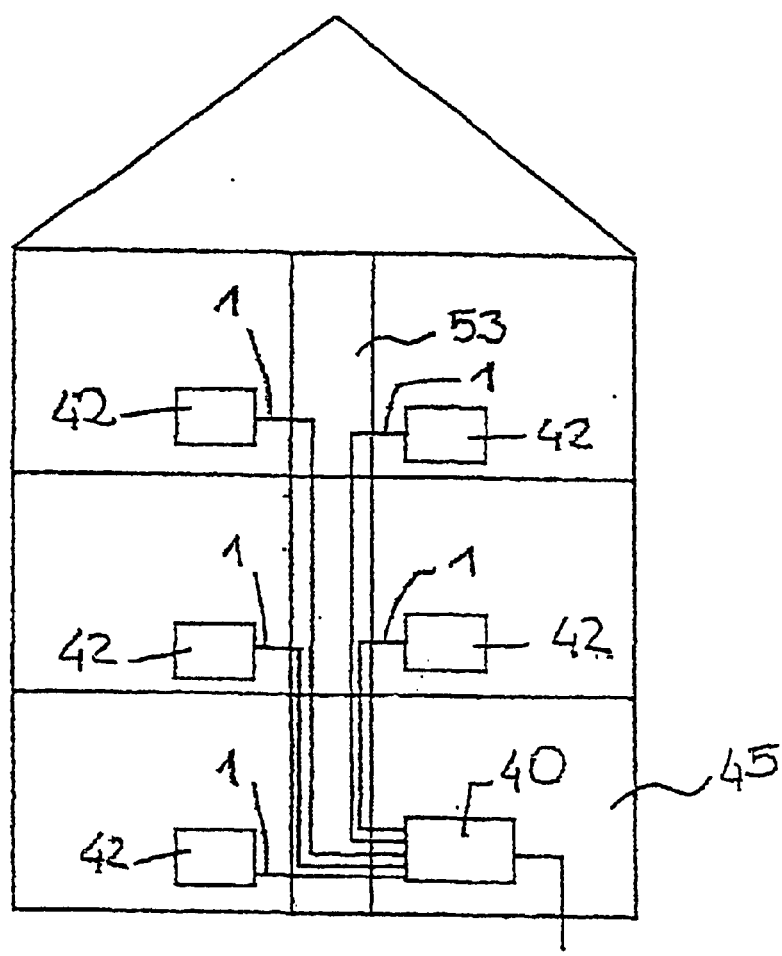
FIG. 8 shows a distribution network of the invention installed in a building with raceways for the passage of optical cables.

FIG. 8 shows a distribution network 100 of the invention installed in a building. More in particular, the distribution unit 40 is arranged in a cellar or basement 45 of the building, and the optical cables 1—housed in a suitable raceway 53 of the building—connect the distribution unit 40 to the user equipment 42 located in the various floors of the building, optionally through domestic optical networks of the type disclosed with reference to FIG. 12.

What is claimed is:

1. A network for distributing signals to a plurality of user equipment comprising a distribution unit; and a plurality of optical cables adapted to make said distribution unit communicate with said plurality of user equipment, each optical cable comprising an optical fibre having a core, a cladding and a predetermined simple refractive index profile $\Delta n(r)$, where $\Delta n(r)$ refers to the refractive index difference between the core and the cladding as a function of the radial distance r, each optical fibre being adapted to provide a single-mode propagation at higher wavelengths than about 1260 nm and a few-mode propagation at about 850 nm;

the refractive index profile $\Delta n(r)$ of each optical fibre being such as to provide macro-bending losses at 1550 nm that are less than about 0.5 dB after 100 turns on a mandrel having a 60-mm diameter; and an intermodal delay $\Delta\tau$ at 850 nm that is less than or equal to, about 1 ns/Km.

2. The distribution network according to claim 1, wherein the intermodal delay $\Delta\tau$ at 850 nm is less than about 0.5 n ns/Km.

3. The distribution network according to claim 2, wherein the intermodal delay $\Delta\tau$ at 850 nm is less than about 0.05 ns/Km.

4. The distribution network according to claim 1, wherein macro-bending losses at 1550 nm after 100 turns on a mandrel having a 60-nm diameter are less than about 0.2 dB.

5. The distribution network according to claim 1, wherein micro-bending losses at 1550 nm of the optical fibres are less than about 15 [(dB/Km)/(g/mm)].

6. The distribution network according to claim 5, wherein micro-bending losses at 1550 nm of the optical fibres are less than about 10 [(dB/Km)/(g/mm)].

7. The distribution network according to claim 1, wherein each optical fibre has a normalized frequency value V at 850 nm between about 3.0 and 3.6.

8. The distribution network according to claim 7, wherein each optical fibre has a normalized frequency value V at 850 nm between about 3.2 and 3.6.

9. The distribution network according to claim 7 or 8, wherein the optical fibre is produced with an outside vapour deposition (OVD) method.

10. A distribution network according to claim 7 or 8, wherein the optical fibre is produced with a vapour axial deposition (VAD) method.

11. The distribution network according to claim 1, wherein each optical fibre has a value of $\Delta n_0$ between about $5*10^{-3}$ and $7*10^{-3}$.

12. The distribution network according to claim 1, wherein a semi-area subtended by the refractive index profile is more than about 0.017 $\mu$m.

13. The distribution network according to claim 12, wherein the semi-area subtended by the refractive index profile is more than about 0.018 $\mu$m.

14. The distribution network according to claim 1, wherein the core radius of each optical fibre is between about 3 $\mu$m and 6 $\mu$m.

15. The distribution network according to claim 1, wherein each optical fibre, outside the cladding, is provided with an external protective coating made of a polymeric material.

16. The distribution network according to claim 15, wherein a portion of said external coating in contact with the cladding, has a higher refractive index than that of the cladding in a temperature range between 10° C. and 60° C.

17. The distribution network according to claim 15, wherein the external protective coating consists of a material capable of strongly absorbing the electromagnetic radiation.

18. The distribution network according to claim 1, wherein each optical cable further comprises a second optical fibre.

19. The distribution network according to claim 1, further comprising a plurality of opto-electronic conversion devices in communication with the plurality of optical cables.

20. The distribution network according to claim 19, wherein each opto-electronic conversion device comprises a photodetector.

21. The distribution network according to claim 19 or 20, wherein each opto-electronic conversion device comprises a light source.

22. The distribution network according to claim 21, wherein said light source is adapted to operate at a wavelength between about 820 and 870 nm.

23. The distribution network according to claim 22, wherein said light source is adapted to operate at a wavelength between about 830 and 860 nm.

24. The distribution network according to claim 22, wherein the light source of at least part of the opto-electronic conversion devices is adapted to operate at a wavelength between about 1300 nm and 1625 nm.

25. The distribution network according to claim 22, adapted to transmit, in the few-mode propagation condition, optical signals at bit rates that are higher than or equal to, 2.5 Gbit/s on a link of about 300-m length.

26. The distribution network according to claim 1, wherein the distribution unit is adapted to multiplex a plurality of signals at different wavelengths in a single WDM optical signal and to send said WDM signal along at least one of said optical cables.

27. The distribution network according to claim 1, further comprising, on a user side, at least one domestic network connected to a corresponding optical cable and adapted to send signals coming from the optical cable to a plurality of user equipment.

28. The distribution network according to claim 27, wherein the domestic network is of the start type.

29. The distribution network according to claim 27, wherein the domestic network is of the bus type.

30. The distribution network according to claim 27, wherein the domestic network comprises a wavelength selective optical coupler adapted to wavelength demultiplex an incoming WDM optical signal at its input.

31. The distribution network according to claim 27, wherein the domestic network comprises an optical coupler adapted to split the power of an incoming WDM optical signal at its input.

32. The distribution network according to claim 1, wherein each optical fibre has a chromatic dispersion value at 1550 nm lower than or equal to one of the following values 20, 19, 18, 17 or 16 ps/(nm*Km).

33. The distribution network according to claim 1, wherein each optical fibre has a chromatic dispersion value at 1550nm lower than or equal to 15.4 ps(nm*Km).

34. An optical fibre having a core, cladding and a predetermined simple refractive index profile $\Delta n(r)$, where $\Delta n(r)$ refers to the refractive index difference between the core and the cladding as a function of the radial distance r, said optical fibre being adapted to provide a single-mode propagation at higher wavelengths than about 1260 nm and a few-mode propagation at about 850 nm, the predetermined refractive index profile $\Delta n(r)$ being adapted to provide macro-bending losses at 1550 nm that are less than about 0.5 dB after 100 turns on a mandrel having a 60-mm diameter; and an intermodal delay $\Delta\tau$ at 850 nm that is less than or equal tp about 1 ns/Km.

35. The optical fibre according to claim 34, having a chromatic dispersion value at 1550 nm lower than or equal to one of the following values 20, 19, 18, 17 or 16 ps/(nm*Km).

36. The optical fibre according to claim 34, having a chromatic dispersion value at 1550 nm lower than or equal to 15.4 ps/(nm*Km).

37. The optical fibre according to claim 34, wherein the intermodal delay $\Delta\tau$ at 850 nm is less than about 0.5 ns/Km.

38. The optical fibre according to claim 37, wherein the intermodal delay $\Delta\tau$ at 850 nm is less than about 0.05 ns/Km.

39. The optical fibre according to claim 34, wherein macro-bending losses at 1550 nm after 100 turns on a mandrel having a 60-nm diameter are less than about 0.2 dB.

40. The optical fibre according to claim 34, wherein micro-bending losses at 1550 nm of the optical fibres are less than about 15 [(dB/Km)/(g/mm)].

41. The optical fibre according to claim 40, wherein micro-bending losses at 1550 nm of the optical fibres are less than about 10 [(dB/Km)/(g/mm)].

42. The optical fibre according to claim 34, wherein the optical fibre has a normalized frequency value V at 850 nm between about 3.0 and 3.6.

43. The optical fibre according to claim 42, wherein the optical fibre has a normalized frequency value V at 850 nm between about 3.2 and 3.6.

44. The optical fibre according to claim 42 or 43, wherein the optical fibre is produced with an outside vapour deposition (OVD) method.

45. The optical fibre according to claim 42 or 43, wherein the optical fibre is produced with a vapour axial deposition (VAD) method.

46. The optical fibre according to claim 34, wherein the optical fibre has a value $\Delta n_0$ between about $5*10^{-3}$ and $7*10^{-3}$.

47. The optical fibre according to claim 34, wherein semi-area subtended by the refractive index profile is more than about 0.017 $\mu$m.

48. The optical fibre according to claim 47, wherein a semi-area subtended by the refractive index profile is more than about 0.018 $\mu$m.

49. The optical fibre according to claim 34, wherein the core radius of the optical fibre is between about 3 $\mu$m and 6 $\mu$m.

50. The optical fibre according to claim 34, wherein the optical fibre, outside the cladding, is provided with an external protective coating made of a polymeric material.

51. The optical fibre according to claim 50, wherein a portion of said external coating in contact with the cladding, has a higher refractive index than that of the cladding in a temperature range between 10° C. and 60° C.

52. The optical fibre according to claim 50, wherein the external protective coating consists of a material capable of strongly absorbing the electromagnetic radiation.

53. A method for the transmission of optical signals at about 850 nm, comprising transmitting said optical signals through at least one optical fibre having a core, a cladding and a predetermined simple refractive index profile $\Delta n(r)$, where $\Delta n(r)$ refers to the refractive index difference between the core and the cladding as a function of the radial distance r, said optical fibre being adapted to provide a single-mode propagation at higher wavelengths than about 1260 nm and a few-mode propagation at about 850 nm, the predetermined refractive index profile $\Delta n(r)$ being adapted to provide macro-bending losses at 1550 nm that are less than about 0.5 dB after 100 turns on a mandrel having a 60-mm diameter; and an intermodal delay $\Delta t$ at 850 nm that is less than or about 1 ns/Km.

54. A method according to claim 53, comprising transmitting the optical signals at a wavelength between about 820 and 870 nm.

* * * * *

UNITED STATES PATENT AND TRADEMARK OFFICE
CERTIFICATE OF CORRECTION

PATENT NO. : 6,885,802 B2
DATED : April 26, 2005
INVENTOR(S) : Guido Oliveti et al.

It is certified that error appears in the above-identified patent and that said Letters Patent is hereby corrected as shown below:

Title page,
Item [57], ABSTRACT,
Line 1, "user" should read -- user equipment --.

Column 25,
Line 31, "0.5 n" should read -- 0.5 --.

Column 26,
Line 65, "ps(nm*Km)" should read -- ps/(nm*Km) --.
Line 66, "cladding" should read -- a cladding --.

Column 27,
Line 11, "tp" should read -- to --.

Column 28,
Lines 7 and 8, "a semi-area" should read -- the semi-area --.
Line 38, "$\Delta t$" should read -- $\Delta \tau$ --.
Line 38, "about" should read -- equal to about --.

Signed and Sealed this

Twenty-third Day of August, 2005

JON W. DUDAS
*Director of the United States Patent and Trademark Office*